(12) United States Patent
Larrigan

(10) Patent No.: US 12,088,974 B2
(45) Date of Patent: Sep. 10, 2024

(54) TRANSPORT OF PACKETS OVER OPTICAL NETWORKS

(71) Applicant: NOKIA SOLUTIONS AND NETWORKS OY, Espoo (FI)

(72) Inventor: Scott Larrigan, Ottawa (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 133 days.

(21) Appl. No.: 17/560,749

(22) Filed: Dec. 23, 2021

(65) Prior Publication Data
US 2023/0209230 A1     Jun. 29, 2023

(51) Int. Cl.
*H04Q 11/00*     (2006.01)

(52) U.S. Cl.
CPC . *H04Q 11/0062* (2013.01); *H04Q 2011/0084* (2013.01)

(58) Field of Classification Search
CPC .................................................. H04Q 11/0062
See application file for complete search history.

(56) References Cited

U.S. PATENT DOCUMENTS

| | | | | |
|---|---|---|---|---|
| 6,535,313 | B1 * | 3/2003 | Fatehi | H04J 14/0241 398/101 |
| 9,455,921 | B2 | 9/2016 | Kakadia et al. | |
| 2004/0208547 | A1 * | 10/2004 | Sabat | H04J 14/0227 398/50 |
| 2015/0295787 | A1 * | 10/2015 | Kakadia | H04L 41/22 370/236 |
| 2016/0182355 | A1 * | 6/2016 | Traxler | H04L 45/122 370/359 |
| 2019/0238250 | A1 * | 8/2019 | Tajima | H04B 10/572 |
| 2020/0280871 | A1 * | 9/2020 | Khirallah | H04W 28/0257 |
| 2022/0303822 | A1 * | 9/2022 | Kotecha | H04M 15/8228 |

FOREIGN PATENT DOCUMENTS

WO     03073138 A2     9/2003

OTHER PUBLICATIONS

Palmieri et al., "GMPLS-based service differentiation for scalable QoS support in all-optical Grid Applications," Future Generation Computer Systems, vol. 22, Issue 6, May 1, 2006, pp. 688-698.
Extended European Search Report, Application No. 22213324.1, May 30, 2023, 7 pages.

* cited by examiner

*Primary Examiner* — Shi K Li
(74) *Attorney, Agent, or Firm* — Tong, Rea, Bentley & Kim, LLC

(57) ABSTRACT

Various example embodiments for supporting transport of data packets over optical fiber networks are presented herein. Various example embodiments for supporting transport of data packets over optical fiber networks may be configured to support transport of data packets over optical fiber networks based on mapping of data packets onto wavelength channels based on quality of service (QoS) mapping. Various example embodiments for supporting transport of data packets over optical fiber networks based on mapping of data packets onto wavelength channels based on QoS mapping may be configured to support transport of data packets over optical fiber networks based on mapping of data packets onto wavelength channels based on QoS mapping information that includes mappings of data packet QoS levels to wavelength channel QoS levels.

19 Claims, 8 Drawing Sheets

TRANSPORT OF PACKETS OVER OPTICAL NETWORKS

TECHNICAL FIELD

Various example embodiments relate generally to communication systems and, more particularly but not exclusively, to communication systems supporting transport of packets over optical networks.

BACKGROUND

In communication systems, various communications technologies may be used to support various types of communications. For example, information may be routed in separate data packets between sources and destinations of a data network. Many modern data networks are operated to provide preselected levels of quality of service (QoS) for some flows of data packets between the source and destination nodes of the data packets.

Such a data network may be supported by variety of physical-layer communication technologies. A widely-used, physical-layer technology uses optical signals carried over optical fibers between various nodes to carry data communications therebetween. In some optical fiber-based networks, the optical signals are organized in a series of separate wavelength channels to support wavelength division multiplexing (WDM). For example, some such WDM optical networks separately modulate the optical signals transmitted to different wavelength channels and may transmit different or independent data streams to different ones of the wavelength channels. In some WDM optical fiber networks, some of the different wavelength channels may be operated according to different formats, e.g., the formats may use different optical symbol constellations, different symbol rates, different amounts of optical amplification, and/or different forward error correction schemes.

SUMMARY

In at least some example embodiments, an apparatus includes a router for data packets and an optical interface device connected to the router and being associated with an optical network node of an optical fiber network, wherein the optical interface device is configured to maintain quality of service (QoS) mapping information including a mapping of a data packet QoS level to a wavelength channel QoS level, and wherein the optical interface device is configured to assign, based on the QoS mapping information, a data packet associated with the data packet QoS level to a wavelength channel associated with the wavelength channel QoS level for transmission by the optical node to the optical fiber network. In at least some example embodiments, the data packet QoS level is defined, at least in part, by a QoS indicator of the data packet. In at least some example embodiments, the QoS indicator of the data packet includes at least one of a QoS marking within the data packet or information determined based on application of deep packet inspection to the data packet. In at least some example embodiments, the QoS marking within the data packet includes at least one of a Differentiated Services Code Point (DSCP) value included within the data packet or a Class of Service (CoS) value included within the data packet. In at least some example embodiments, the data packet QoS level is determined, at least in part, by a virtual network or virtual service with which the data packet is associated and a QoS indicator of the data packet. In at least some example embodiments, the virtual network with which the data packet is associated includes a virtual local area network (VLAN) or the virtual service with which the data packet is associated includes a virtual private local area network (LAN) service (VPLS). In at least some example embodiments, the data packet QoS level is determined, at least in part, by a label of the data packet and a QoS indicator of the data packet. In at least some example embodiments, the label of the data packet identifies a destination device for the data packet. In at least some example embodiments, the data packet QoS level is determined, at least in part, by a data packet QoS treatment level. In at least some example embodiments, the wavelength channel QoS level identifies the wavelength channel. In at least some example embodiments, the wavelength channel QoS level identifies a wavelength channel QoS treatment level for the wavelength channel. In at least some example embodiments, to assign the data packet associated with the data packet QoS level to the wavelength channel associated with the wavelength channel QoS level, the optical interface device is configured to at least determine, based on data packet QoS information from the data packet, the data packet QoS level of the QoS mapping information, determine, based on the data packet QoS level of the QoS mapping information, the wavelength channel QoS level of the QoS mapping information, determine, based on the wavelength channel QoS level of the QoS mapping information, the wavelength channel, and assign the data packet to the wavelength channel. In at least some example embodiments, the QoS mapping information is received from a remote digital controller. In at least some example embodiments, the optical interface device is configured to provide an interface between a set of client networks and a set of optical transceivers of the optical network node. In at least some example embodiments, the apparatus further includes a reconfigurable optical add drop multiplexer, the reconfigurable optical add drop multiplexer being communicatively connected to or including the optical interface device. In at least some example embodiments, the optical interface device includes a set of client interfaces configured to receive data packets from at least one packet routing device and a set of optical transponders configured to transmit and received data-modulated optical carriers on a plurality of wavelength channels.

In at least some example embodiments, an apparatus includes at least one processor and at least one memory including computer program code, wherein the at least one memory and the computer program code are configured to, with the at least one processor, cause the apparatus to at least maintain, by a network element, quality of service (QoS) mapping information including a mapping of a data packet QoS level to a wavelength channel QoS level, and assign, by the network element based on the QoS mapping information, a data packet associated with the data packet QoS level to a wavelength channel associated with the wavelength channel QoS level. In at least some example embodiments, the data packet QoS level is defined, at least in part, by a QoS indicator of the data packet. In at least some example embodiments, the QoS indicator of the data packet includes at least one of a QoS marking within the data packet or information determined based on application of deep packet inspection to the data packet. In at least some example embodiments, the QoS marking within the data packet includes at least one of a Differentiated Services Code Point (DSCP) value included within the data packet or a Class of Service (CoS) value included within the data packet. In at least some example embodiments, the data packet QoS level is determined, at least in part, by a virtual network or virtual service with which the data packet is associated and a QoS indicator of the data packet. In at least some example embodiments, the virtual network with which the data packet is associated includes a virtual local area network (VLAN) or the virtual service with which the data packet is associated includes a virtual private local area network (LAN) service (VPLS). In at least some example embodiments, the data packet QoS level is determined, at least in part, by a label of the data packet and a QoS indicator of the data packet. In at least some example embodiments, the label of the data packet identifies a destination device for the data packet. In at least some example embodiments, the data packet QoS level is determined, at least in part, by a data packet QoS treatment level. In at least some example embodiments, the wavelength channel QoS level identifies the wavelength channel. In at least some example embodiments, the wavelength channel QoS level identifies a wavelength channel QoS treatment level for the wavelength channel. In at least some example embodiments, to assign the data packet associated with the data packet QoS level to the wavelength channel associated with the wavelength channel QoS level, the at least one memory and the computer program code are configured to, with the at least one processor, cause the apparatus to at least determine, based on data packet QoS information from the data packet, the data packet QoS level of the QoS mapping information, determine, based on the data packet QoS level of the QoS mapping information, the wavelength channel QoS level of the QoS mapping information, determine, based on the wavelength channel QoS level of the QoS mapping information, the wavelength channel, and assign the data packet to the wavelength channel. In at least some example embodiments, the QoS mapping information is received from a remote digital controller. In at least some example embodiments, the optical interface device is configured to provide an interface between a set of client networks and a set of optical transceivers of the optical network node. In at least some example embodiments, the apparatus further includes a reconfigurable optical add drop multiplexer, the reconfigurable optical add drop multiplexer being communicatively connected to or including the optical interface device. In at least some example embodiments, the optical interface device includes a set of client interfaces configured to receive data packets from at least one packet routing device and a set of optical transponders configured to transmit and received data-modulated optical carriers on a plurality of wavelength channels.

In at least some example embodiments, an apparatus includes means for maintaining, by a network element, quality of service (QoS) mapping information including a mapping of a data packet QoS level to a wavelength channel QoS level, and means for assigning, by the network element based on the QoS mapping information, a data packet associated with the data packet QoS level to a wavelength channel associated with the wavelength channel QoS level. In at least some example embodiments, the data packet QoS level is defined, at least in part, by a QoS indicator of the data packet. In at least some example embodiments, the QoS indicator of the data packet includes at least one of a QoS marking within the data packet or information determined based on application of deep packet inspection to the data packet. In at least some example embodiments, the QoS marking within the data packet includes at least one of a Differentiated Services Code Point (DSCP) value included within the data packet or a Class of Service (CoS) value included within the data packet. In at least some example embodiments, the data packet QoS level is determined, at least in part, by a virtual network or virtual service with which the data packet is associated and a QoS indicator of the data packet. In at least some example embodiments, the virtual network with which the data packet is associated includes a virtual local area network (VLAN) or the virtual service with which the data packet is associated includes a virtual private local area network (LAN) service (VPLS). In at least some example embodiments, the data packet QoS level is determined, at least in part, by a label of the data packet and a QoS indicator of the data packet. In at least some example embodiments, the label of the data packet identifies a destination device for the data packet. In at least some example embodiments, the data packet QoS level is determined, at least in part, by a data packet QoS treatment level. In at least some example embodiments, the wavelength channel QoS level identifies the wavelength channel. In at least some example embodiments, the wavelength channel QoS level identifies a wavelength channel QoS treatment level for the wavelength channel. In at least some example embodiments, the means for assigning the data packet associated with the data packet QoS level to the wavelength channel associated with the wavelength channel QoS level includes means for determining, based on data packet QoS information from the data packet, the data packet QoS level of the QoS mapping information, means for determining, based on the data packet QoS level of the QoS mapping information, the wavelength channel QoS level of the QoS mapping information, means for determining, based on the wavelength channel QoS level of the QoS mapping information, the wavelength channel, and means for assigning the data packet to the wavelength channel. In at least some example embodiments, the QoS mapping information is received from a remote digital controller. In at least some example embodiments, the optical interface device is configured to provide an interface between a set of client networks and a set of optical transceivers of the optical network node. In at least some example embodiments, the apparatus further includes a reconfigurable optical add drop multiplexer, the reconfigurable optical add drop multiplexer being communicatively connected to or including the optical interface device. In at least some example embodiments, the optical interface device includes a set of client interfaces configured to receive data packets from at least one packet routing device and a set of optical transponders configured to transmit and received data-modulated optical carriers on a plurality of wavelength channels.

In at least some example embodiments, a non-transitory computer-readable medium stores computer program code configured to cause an apparatus to maintain, by a network element, quality of service (QoS) mapping information including a mapping of a data packet QoS level to a wavelength channel QoS level, and means for assign, by the network element based on the QoS mapping information, a data packet associated with the data packet QoS level to a wavelength channel associated with the wavelength channel QoS level. In at least some example embodiments, the data packet QoS level is defined, at least in part, by a QoS indicator of the data packet. In at least some example embodiments, the QoS indicator of the data packet includes at least one of a QoS marking within the data packet or information determined based on application of deep packet inspection to the data packet. In at least some example embodiments, the QoS marking within the data packet includes at least one of a Differentiated Services Code Point (DSCP) value included within the data packet or a Class of Service (CoS) value included within the data packet. In at least some example embodiments, the data packet QoS level is determined, at least in part, by a virtual network or virtual service with which the data packet is associated and a QoS indicator of the data packet. In at least some example embodiments, the virtual network with which the data packet is associated includes a virtual local area network (VLAN) or the virtual service with which the data packet is associated includes a virtual private local area network (LAN) service (VPLS). In at least some example embodiments, the data packet QoS level is determined, at least in part, by a label of the data packet and a QoS indicator of the data packet. In at least some example embodiments, the label of the data packet identifies a destination device for the data packet. In at least some example embodiments, the data packet QoS level is determined, at least in part, by a data packet QoS treatment level. In at least some example embodiments, the wavelength channel QoS level identifies the wavelength channel. In at least some example embodiments, the wavelength channel QoS level identifies a wavelength channel QoS treatment level for the wavelength channel. In at least some example embodiments, to assign the data packet associated with the data packet QoS level to the wavelength channel associated with the wavelength channel QoS level, the computer-readable medium stores is configured to cause the apparatus to at least determine, based on data packet QoS information from the data packet, the data packet QoS level of the QoS mapping information, determine, based on the data packet QoS level of the QoS mapping information, the wavelength channel QoS level of the QoS mapping information, determine, based on the wavelength channel QoS level of the QoS mapping information, the wavelength channel, and assign the data packet to the wavelength channel. In at least some example embodiments, the QoS mapping information is received from a remote digital controller. In at least some example embodiments, the optical interface device is configured to provide an interface between a set of client networks and a set of optical transceivers of the optical network node. In at least some example embodiments, the apparatus includes a reconfigurable optical add drop multiplexer, the reconfigurable optical add drop multiplexer being communicatively connected to or including the optical interface device. In at least some example embodiments, the optical interface device includes a set of client interfaces configured to receive data packets from at least one packet routing device and a set of optical transponders configured to transmit and received data-modulated optical carriers on a plurality of wavelength channels.

In at least some example embodiments, a method includes maintaining, by a network element, quality of service (QoS) mapping information including a mapping of a data packet QoS level to a wavelength channel QoS level, and assigning, by the network element based on the QoS mapping information, a data packet associated with the data packet QoS level to a wavelength channel associated with the wavelength channel QoS level. In at least some example embodiments, the data packet QoS level is defined, at least in part, by a QoS indicator of the data packet. In at least some example embodiments, the QoS indicator of the data packet includes at least one of a QoS marking within the data packet or information determined based on application of deep packet inspection to the data packet. In at least some example embodiments, the QoS marking within the data packet includes at least one of a Differentiated Services Code Point (DSCP) value included within the data packet or a Class of Service (CoS) value included within the data packet. In at least some example embodiments, the data packet QoS level is determined, at least in part, by a virtual network or virtual service with which the data packet is associated and a QoS indicator of the data packet. In at least some example embodiments, the virtual network with which the data packet is associated includes a virtual local area network (VLAN) or the virtual service with which the data packet is associated includes a virtual private local area network (LAN) service (VPLS). In at least some example embodiments, the data packet QoS level is determined, at least in part, by a label of the data packet and a QoS indicator of the data packet. In at least some example embodiments, the label of the data packet identifies a destination device for the data packet. In at least some example embodiments, the data packet QoS level is determined, at least in part, by a data packet QoS treatment level. In at least some example embodiments, the wavelength channel QoS level identifies the wavelength channel. In at least some example embodiments, the wavelength channel QoS level identifies a wavelength channel QoS treatment level for the wavelength channel. In at least some example embodiments, to assign the data packet associated with the data packet QoS level to the wavelength channel associated with the wavelength channel QoS level, the optical interface device is configured to at least determine, based on data packet QoS information from the data packet, the data packet QoS level of the QoS mapping information, determine, based on the data packet QoS level of the QoS mapping information, the wavelength channel QoS level of the QoS mapping information, determine, based on the wavelength channel QoS level of the QoS mapping information, the wavelength channel, and assign the data packet to the wavelength channel. In at least some example embodiments, the QoS mapping information is received from a remote digital controller. In at least some example embodiments, the optical interface device is configured to provide an interface between a set of client networks and a set of optical transceivers of the optical network node. In at least some example embodiments, the optical interface device is associated with a reconfigurable optical add drop multiplexer, the reconfigurable optical add drop multiplexer being communicatively connected to or including the optical interface device. In at least some example embodiments, the optical interface device includes a set of client interfaces configured to receive data packets from at least one packet routing device and a set of optical transponders configured to transmit and received data-modulated optical carriers on a plurality of wavelength channels.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
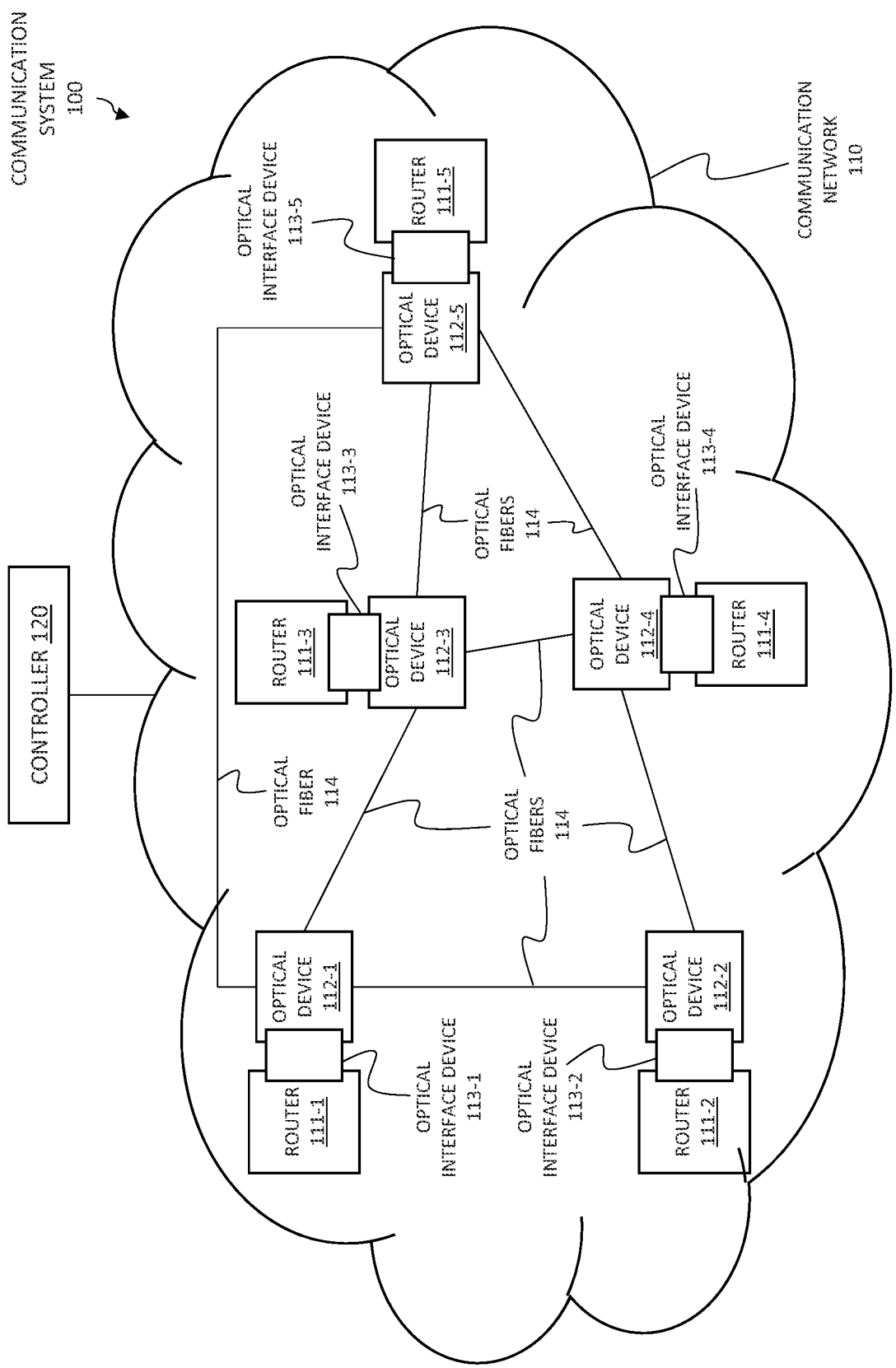
FIG. 1 depicts an example embodiment of a communication system configured to support transport of data packets over wavelength division multiplexed (WDM) optical fiber networks based on quality of service (QoS) mapping.

Various example embodiments for supporting transport of data packets over WDM optical fiber links or networks are presented herein. Various example embodiments for supporting transport of data packets over WDM optical fiber links or networks may be configured to support transport of data packets over optical fiber links or networks based on mapping of packets onto wavelengths based on quality of service (QoS) mapping. Various example embodiments for supporting mapping of data packets onto wavelength channels based on QoS mapping may be configured to support mapping of data packets onto WDM wavelength channels based on QoS mapping information. Various example embodiments for supporting mapping of data packets onto WDM wavelength channels based on QoS mapping information may be configured to support mapping of data packets onto WDM wavelength channels based on QoS mapping information that includes mappings of data packet QoS levels to wavelength QoS levels. Various example embodiments for supporting mapping of data packets onto WDM wavelength channels based on QoS mapping information may be configured to assign data packets having data packet QoS levels matching data packet QoS levels of the QoS mapping information to WDM wavelength channels having wavelength channel QoS levels matching wavelength channel QoS levels of the QoS mapping information. Various example embodiments for supporting transport of data packets over WDM optical fiber networks based on QoS mapping may be configured to provide a wavelength fabric for supporting transport of data packets over WDM optical fiber networks. Various example embodiments for supporting transport of data packets over WDM optical fiber networks based on QoS mapping may be configured to provide a new approach, model, and implementation for building and running data packet and WDM optical fiber networks to attain improved or optimal network connectivity performance at a reduced or even optimal cost (e.g., significant capital expenditure (CAPEX) and operating expenditure (OPEX) savings to reduce network total cost of ownership (TCO)).

It will be appreciated that, herein, both "wavelength" and "wavelength channel" are used to refer to a single physical optical communication channel having a selected width and a physical center wavelength, e.g., a single contiguous physical wavelength channel of a selected WDM grid.

It will be appreciated that, herein, optical fiber refers to one or more end-connected spans of physical optical fiber or one or more end-connected spans of physical optical fiber pairs, wherein the two physical optical fibers of a pair are configured to support optical communications in opposite directions between the same two optical transceivers. Each such span may or may not include in-line optical amplifier(s).

It will be appreciated that these and various other example embodiments and advantages or potential advantages of supporting transport of data packets over WDM optical fiber networks based on QoS mapping may be further understood by way of reference to the various figures, which are discussed further below.

FIG. 1 depicts an example embodiment of a communication system configured to support transport of data packets over WDM optical fiber networks based on quality of service (QoS) mapping.

The communication system 100 includes a communication network 110 and a controller 120. The communication network 110 includes a set of routers 111 (illustratively, routers 111-1-111-5), a set of optical devices 112 (illustratively, optical nodes 112-1-112-5), a set of optical interface devices 113 (illustratively, optical interface devices 113-1-113-5) and a set of optical fibers 114. The controller 120 may be configured to provide various control functions for the communication network 110.

In the communication system 100, the routers 111, the optical devices 112, and the optical interface devices 113 may cooperate to support transport of data packets within the communication network 110. The routers 111 are configured to provide a data packet network supporting communications based on data packets. For example, the routers 111 may be configured to support communication of Internet Protocol (IP) packets or other types of data packets. The optical devices 112 are configured to provide an optical fiber network supporting communications of the routers 111 based on optical signals sent over WDM wavelength channels on the optical fibers 114. For example, the optical devices 112 may network the WDM wavelength channels via reconfigurable optical add/drop multiplexers (ROADMs) or optical cross-connects (OXC), e.g., based on coherent optical transponders and phase shift keying formats. The optical interface devices 113 are configured to operate as interfaces between the routers 111 and the optical devices 112 for enabling transport of data packets of the routers 111 over WDM wavelength channels of the optical fiber network provided by the optical devices 112 and the optical fibers 114 (illustratively, optical interface devices 113-1-113-5 operate as interfaces between routers 111-1-111-5 and optical devices 112-1-112-5, respectively). The optical interface devices 113 support packet-to-optical interfaces for supporting mapping of data packets from router ports of the routers 111 onto WDM wavelength channels of the optical fibers 114 supported by the optical devices 112 and optical-to-packet interfaces for supporting mapping of data packets from WDM wavelength channels of the optical fibers 114 supported by the optical devices 112 onto router ports of the routers 111. It will be appreciated that the optical interface devices 113 also may be referred to herein as optical fiber network interface devices based on a capability to interface with the optical fiber network, optical fabric interfaces devices based on a capability to interface with the wavelength fabric, and/or optical network/fabric interface devices based on a capability to interface with a wavelength fabric supported by the optical fiber network. The different optical devices 112 are configured to support data communications therebetween by WDM wavelength channels over optical fibers 114 and, thus, between the routers 111.

In the communication system 100, the routers 111, the optical devices 112, and the optical interface devices 113 may be configured in various ways to support transport of data packets within the communication network 110. For example, a router 111 may be a digital electronics device that controls routing of data packets in a data network (e.g., the abstract communications network built over the physical layer network), which may be software operated and/or controlled. For example, an optical device 112 may be a physical optical layer device, which may include optical transponders, e.g., having optical data receivers and optical data transmitters, optical amplifiers, physical layer wavelength channel switching/routing devices, which may include, e.g., ROADMs, OADMs (optical add/drop multiplexers), optical wavelength selective switches (OWSSeS), OXCs (optical cross-connects), physical optical fiber interfaces, optical dispersion compensators, and/or optical wavelength MUX/DEMUXes. For example, an optical interface device 113 may be a digital electronics device, which here assigns data packets to optical wavelength channels for optical transmission and also assigns segments of a decoded received optical data stream to data packets for further digital processing (e.g., by the associated router 111).

The communication system 100 may be configured to support mapping of data packets from router ports of the routers 111 onto WDM wavelength channels for the optical fibers 114, as supported by the optical interface devices 113. The switching of data packets from router ports of the routers 111 onto WDM wavelength channels of the optical fibers 114 supported by the optical interface devices 113 may be based on QoS matching for matching data packet QoS to wavelength channel QoS. The data packet QoS for data packets in the data packet network may be defined based on one or more packet QoS parameters, such as capacity, latency, availability, or the like, as well as various combinations thereof. The wavelength channel QoS for the wavelength channels of the optical fiber network may be defined based on one or more wavelength channel QoS parameters, such as capacity, latency, availability, or the like, as well as various combinations thereof. The data packet QoS may be indicative of a wavelength channel availability requirement for data packets associated with that data packet QoS and, similarly, the wavelength QoS may have a wavelength channel availability associated therewith where wavelength channel availability may be indicative of capacity of the wavelength channel and reach of the wavelength channel (which may be balanced based on margin requirements). It will be appreciated that data packet QoS may be based on various other packet QoS parameters, wavelength channel QoS may be based on various other wavelength channel QoS parameters, or the like, as well as various combinations thereof. The QoS matching for matching data packet QoS to wavelength channel QoS for controlling mapping of data packets to wavelength channels may be based on QoS mapping information that maps data packet QoS to wavelength channel QoS.

The communication system 100 may be configured to support mapping of data packets, from router ports of the routers 111 onto wavelength channels of the optical fibers 114 supported by the optical interface devices 113, based on QoS mapping information configured to map data packet QoS levels to wavelength channel QoS levels. The communication network 110 may be configured to support mapping of data packets, from router ports of the routers 111 onto wavelength channels of the optical fibers 114 supported by the optical interface devices 113, based on QoS mapping information configured to map data packet QoS levels to wavelength channel QoS levels. The optical interface devices 113 may be configured to support mapping of data packets, from router ports of the routers 111 onto wavelength channels of the optical fibers 114 supported by the optical interface devices 113, based on QoS mapping information configured to map data packet QoS levels to wavelength channel QoS levels (e.g. by using QoS mapping information maintained by the optical interface devices 113 for assigning data packets to wavelength channels based on QoS matching). The controller 120 may be configured to support mapping of data packets, from router ports of the routers 111 onto wavelength channels of the optical fibers 114 supported by the optical interface devices 113, based on QoS mapping information configured to map data packet QoS levels to wavelength channel QoS levels (e.g., by determining the QoS mapping information and providing the QoS mapping information to the communication network 110, such as to the optical interface devices 113 and, optionally, other elements). It will be appreciated that the communication system 100 may be configured to support various other functions for supporting mapping of data packets to wavelength channels based on QoS mapping information.

The communication system 100 may be configured to support mapping of data packets, from router ports of the routers 111 onto wavelength channels of the optical fibers 114 supported by the optical interface devices 113, based on QoS mapping information that includes data packet QoS levels which may be specified in various ways. For example, as primarily presented herein, the data packet QoS levels of the QoS mapping information may be specified using data packet QoS information which may be determined from the data packets, such as packet QoS indicators of the data packets (e.g., packet QoS markings included within the data packets (e.g., Differentiated Services Code Point (DSCP) values, Class of Service (CoS) values, or the like), tuples determined from the data packets (e.g., a 5-tuple based on source and destination IP addresses, source and destination ports, and protocol, or other suitable tuples which may be based on various header fields or combinations of header fields), information determined based on application of deep packet inspection (DPI) to the data packets, or the like), virtual networks or services with which the data packets are associated (e.g., virtual local area networks (VLANs), virtual private local area network (LAN) services (VPLSs), or the like), identifiers associated with destinations for which the data packets are intended (e.g., labels, addresses, or the like), or the like, as well as various combinations thereof. For example, the data packet QoS levels of the QoS mapping information may be specified using data packet QoS treatment levels (e.g., gold packet QoS, silver packet QoS, bronze packet QoS, yellow packet QoS, or the like). For example, the data packet QoS levels of the QoS mapping information may be specified using data packet QoS parameters (e.g., various combinations of values for one or more data packet QoS parameters such a capacity, latency, availability, or the like, as well as various combinations thereof. It will be appreciated that "availability" here refers to a measure of network reliability that is based on uptime (e.g., an uptime percentage, such as four-nines (99.99% uptime), five-nines (99.999% uptime), or the like). It will be appreciated that the data packet QoS levels of the QoS mapping information may be specified or defined in various other ways.

The communication system 100 may be configured to support mapping of data packets, from router ports of the routers 111 onto wavelength channels of the optical fibers 114 supported by the optical interface devices 113, based on QoS mapping information that includes wavelength channel QoS levels which may be specified in various ways. For example, as primarily presented herein, the wavelength channel QoS levels of the QoS mapping information may be specified by identifying specific wavelength channels (e.g., having specific wavelength channel QoS treatment levels, engineered to support specific values of one or more wavelength channel QoS parameters, or the like, as well as various combinations thereof) to which data packets having the associated data packet QoS level are to be mapped. For example, the wavelength channel QoS levels of the QoS mapping information may be specified using wavelength channel QoS treatment levels (e.g., gold wavelength channel QoS, silver wavelength channel QoS, bronze wavelength channel QoS, yellow wavelength channel QoS, or the like). For example, the wavelength channel QoS levels of the QoS mapping information may be specified using wavelength channel QoS parameters (e.g., various combinations of values for one or more wavelength channel QoS parameters such a capacity, latency, availability, or the like, as well as various combinations thereof. It will be appreciated that the wavelength channel QoS levels of the QoS mapping information may be specified or defined in various other ways.

The communication system 100 may be configured to support mapping of data packets from router ports of the routers 111 onto wavelength channels of the optical fibers 114 supported by the optical interface devices 113, based on QoS mapping information, in various ways. The mapping of data packets from router ports of the routers 111 onto wavelength channels of the optical fibers 114 supported by the optical interface devices 113 may be performed in a number of ways, at least some of which may depend on the manner in which the data packet QoS level to wavelength channel QoS level mappings are defined.

In at least some example embodiments, for example, where the data packet QoS levels of the QoS mapping information are specified using data packet QoS information which may be determined from the data packets and the wavelength channel QoS levels of the QoS mapping information are specified by identifying specific wavelength channels, the mapping of data packets to wavelength channels may be performed as follows. For example, the mapping of a data packet to a wavelength channel based on the QoS mapping information may be performed by determining a packet QoS of the data packet based on data packet QoS information determined from the data packet, using the data packet QoS of the data packet as an input into the QoS mapping information to identify an entry of the QoS mapping information (e.g., matching the data packet QoS information from the data packet to data packet QoS information in the QoS mapping information), and determining the wavelength channel from the identified entry of the QoS mapping information (e.g., the identified entry of the QoS mapping information specifically identifies the wavelength channel to which the data packet is provided). The optical interface device 113 may then assign the data packet from the router 111 onto the identified wavelength channel on one of the optical fibers 114 for transmission over the optical fiber network. It will be appreciated that at least some such example embodiments may be further understood by way of reference to the example of FIGS. 3-5.

In at least some example embodiments, as indicated above, the mapping of data packets to wavelength channels based on QoS mapping information may be based on data packet QoS information that includes packet QoS indicators of the data packets. Here, the QoS mapping information is based on packet QoS indicators of data packets and, thus, the data packet QoS level of a data packet that is used as an input into the QoS mapping information to determine a wavelength channel QoS level for the data packet may be based on the packet QoS indicator of the data packet. The packet QoS indicator of the data packet may be determined from the data packet in various ways, such as based on a QoS marking within the data packet (e.g., a DSCP value, a CoS value, or the like), based on matching of a tuple from the header of the data packet (e.g., a 5-tuple based on source and destination IP addresses, source and destination ports, and protocol, or other suitable tuples which may be based on various header fields or combinations of said header fields), based on deep packet inspection on the data packet, or the like, as well as various combinations thereof. It will be appreciated that such example embodiments may be further understood by way of reference to the example embodiments presented with respect to FIG. 3.

In at least some example embodiments, as indicated above, the mapping of data packets to wavelength channels based on QoS mapping information may be based on data packet QoS information that includes VLANs with which the data packets are associated and packet QoS indicators of the data packets. Here, the QoS mapping information is based on VLAN IDs associated with the data packets and packet QoS indicators of the data packets and, thus, the data packet QoS level of a data packet that is used as an input into the QoS mapping information to determine a wavelength channel QoS level for the data packet may be based on the VLAN ID associated with the data packet and the packet QoS indicator of the data packet. The VLAN ID associated with the data packet may be determined from the data packet, from VLAN mapping information based on information from the data packet, or the like, as well as various combinations thereof. The packet QoS indicator of the data packet may be determined from the data packet in various ways, such as based on a QoS marking within the data packet (e.g., a DSCP value, a CoS value, or the like), based on matching of a tuple from the header of the data packet, based on deep packet inspection on the data packet, or the like, as well as various combinations thereof. It will be appreciated that such example embodiments may be further understood by way of reference to the example embodiments presented with respect to FIG. 4.

In at least some example embodiments, as indicated above, the mapping of data packets to wavelength channels based on QoS mapping information may be based on data packet QoS information that includes labels associated with the data packets and packet QoS indicators of the data packets. Here, the QoS mapping information is based on labels associated with the data packets and packet QoS indicators of the data packets and, thus, the data packet QoS level of a data packet that is used as an input into the QoS mapping information to determine a wavelength channel QoS level for the data packet may be based on the label associated with the data packet and the packet QoS indicator of the data packet. The label associated with the data packet may be determined from the data packet, from label mapping information identified based on information from the data packet, or the like, as well as various combinations thereof. The packet QoS indicator of the data packet may be determined from the data packet in various ways, such as based on a QoS marking within the data packet (e.g., a DSCP value, a CoS value, or the like), based on matching of a tuple from the header of the data packet, based on deep packet inspection on the data packet, or the like, as well as various combinations thereof. It will be appreciated that such example embodiments may be further understood by way of reference to the example embodiments presented with respect to FIG. 5.

In at least some example embodiments, for example, where the data packet QoS levels of the QoS mapping information are specified using data packet QoS treatment levels (e.g., gold, silver, or the like) and the wavelength channel QoS levels of the QoS mapping information are specified using wavelength channel QoS treatment levels (e.g., gold, silver, or the like), the mapping of data packets to wavelength channels may be performed as follows. For example, the mapping of a data packet to a wavelength channel based on the QoS mapping information may be determined by determining a data packet QoS of the data packet based on data packet QoS information determined from the data packet, using the data packet QoS of the data packet to determine a data packet QoS treatment level for the data packet, using the data packet QoS treatment level for the data packet as an input into the QoS mapping information to identify an entry of the QoS mapping information (e.g., matching the data packet QoS treatment level), determining a wavelength channel QoS treatment level from the identified entry of the QoS mapping information (e.g., the identified entry of the QoS mapping information specifies the wavelength channel QoS treatment level that needs to be supported by the wavelength channel to which the data packet is provided), and determining the wavelength channel based on the wavelength channel QoS treatment level (e.g., from a separate mapping that maps wavelength channel QoS treatment levels to specific wavelength channels engineered to support the wavelength channel QoS treatment level). The optical interface device 113 may then assign the data packet from the router 111 onto the identified wavelength channel on one of the optical fibers 114 for transmission over the optical fiber network.

It will be appreciated that the mapping of data packets from router ports of the routers 111 onto wavelength channels of the optical fibers 114 supported by the optical interface devices 113, based on QoS mapping information, may be performed in various other ways.

The communication network 110 may be configured to support switching of data packets, from router ports of the routers 111 onto wavelength channels of the optical fibers 114 supported by the optical interface devices 113, based on QoS mapping information configured to map data packet QoS levels to wavelength channel QoS levels. The network elements of the communication network 110 may be configured to support mapping of data packets, from router ports of the routers 111 onto wavelength channels of the optical fibers 114 supported by the optical interface devices 113, based on QoS mapping information configured to map data packet QoS levels to wavelength channel QoS levels. The network elements of the communication network 110 may be configured to support mapping of data packets from router ports of the routers 111 onto wavelength channels of the optical fibers 114 supported by the optical interface devices 113, based on QoS mapping information configured to map data packet QoS levels to wavelength channel QoS levels, independent of the controller 120 (e.g., based on QoS mapping information that is hardcoded on network elements of the communication network 110) and/or in conjunction with the controller 120 (e.g., based on QoS mapping information received by the network elements of the communication network 110 from the controller 120).

The controller 120 may be configured to provide various control functions for the communication network 110. The controller 120 may be configured to support mapping of data packets, from router ports of the routers 111 onto wavelength channels of the optical fibers 114 supported by the optical interface devices 113, based on QoS mapping information configured to map data packet QoS levels to wavelength channel QoS levels. The controller 120 may be configured to support mapping of data packets, from router ports of the routers 111 onto wavelength channels of the optical fibers 114 supported by the optical interface devices 113 based on QoS mapping information configured to map data packet QoS levels to wavelength channel QoS levels, by providing the QoS mapping information, or portions thereof, to network elements of the communication network 110. The controller 120 may be configured to provide various other control functions for the communication network 110. It will be appreciated that, although primarily presented with respect to example embodiments in which a single controller (namely, the controller 120) is configured to provide control functions for both the data packet network (e.g., the routers 111), the optical fiber network (e.g., the optical devices 112 and the optical interface devices 113), in at least some example embodiments multiple controllers may be used to provide control functions (e.g., a packet network controller configured to provide control functions for the data packet network and an optical fiber network controller configured to provide control functions for the optical fiber network).

It will be appreciated that, although primarily presented with respect to use of standalone optical interfaces devices 113 which are separate from the routers 111 and the optical devices 112, in at least some example embodiments the optical interface devices 113 may be integrated with other network elements (e.g., integrated as part of the routers 111, integrated as part of the optical devices 112, or the like). It will be appreciated that various combinations of such optical interface devices 113 (e.g., standalone and/or integrated) may be used.

It will be appreciated that FIG. 1, although primarily presented with respect to specific types, numbers, and arrangements of elements (e.g., routers 111, optical devices 112, optical interface devices 113, optical fibers 114, or the like), may include various other types, numbers, and/or arrangements of elements (e.g., routers 111, optical devices 112, optical interface devices 113, optical fibers 114, or the like, as well as various combinations thereof).

It will be appreciated that support for transport of data packets over wavelength channels based on QoS mapping information may be used in conjunction with various communications technologies. For example, support for transport of data packets over wavelength channels based on QoS mapping information may be based on use of communications technologies such as Software Defined Networking (SDN), Segment Routing (SR), or the like, as well as various combinations thereof. For example, routers 111 may use a VLAN service to bypass other routers. For example, an optical GMPLS implementation can be used to protect wavelength channels based on the data packet QoS traffic being carried by the wavelength channels (e.g., packet gold traffic can be placed on a wavelength channel that is protected with GMPLS protection and restoration, whereas wavelength channels carrying lower data packet QoS traffic can be protected using priority based GMPLS restoration techniques). For example, within the context of supporting transport of data packets over wavelength channels based on QoS mapping information, the controller 120 may use various capabilities to ensure that underlying router port wavelength channels are protected against link failures and do not create routing loops when bypassing adjacent routers (e.g., SR Flexible Algorithm (Flex-Algo), Topology Independent-Loop Free Alternate (TI-LFA), and so forth). It will be appreciated that support for transport of data packets over wavelength channels based on QoS mapping information may be used in conjunction with various other communications technologies.

Figure 2:
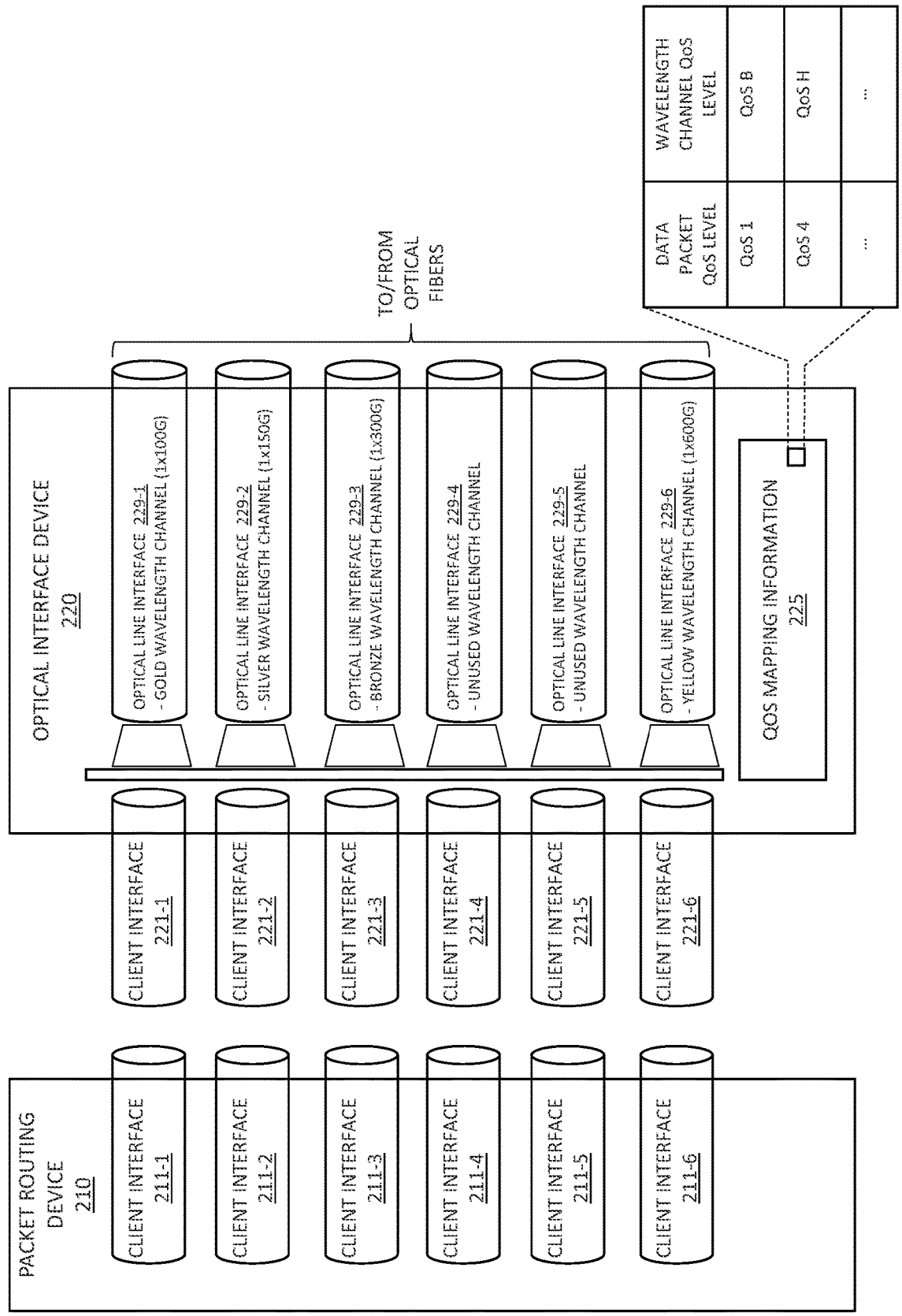
FIG. 2 depicts an example embodiment of a packet routing device and an optical interface device for illustrating mapping of data packets of a packet network to wavelength channels of an optical fiber network based on QoS mapping.

FIG. 2 depicts an example embodiment of a packet routing device and an optical interface device for illustrating mapping of data packets of a packet network to wavelength channels of an optical fiber network based on QoS mapping.

In FIG. 2, the packet routing device 210 and the optical interface device 220 interface via pluggable client interfaces to support mapping between data packets supported on the packet routing device 210 and wavelength channels supported by the optical interface device 220. The support for mapping between data packets supported on the packet routing device 210 and wavelength channels supported by the optical interface device 220 may include support for transmission of data packets from the packet routing device 210 via the optical interface device 220 and support for reception of data packets for the packet routing device 210 via the optical interface device 220.

The packet routing device 210 includes a set of six pluggable client interfaces 211-1-211-6 (collectively, pluggable client interfaces 211) which, in the example of FIG. 2, are 800 G pluggable client interfaces. The optical interface device 220 includes a set of six pluggable client interfaces 221-1-221-6 (collectively, pluggable client interfaces 221) which, in the example of FIG. 2, are 800 G pluggable client interfaces. It will be appreciated that various other rates also or alternatively may be supported for the pluggable client interfaces 211 of the packet routing device 210 and the pluggable client interfaces 221 of the optical interface device 220. The pluggable client interfaces 211 of the packet routing device 210 are mapped to, i.e., connected to corresponding ones of, the pluggable client interfaces 221 of the optical interface device 220. The pluggable client interfaces 211 and pluggable client interfaces 221 may be configured to support various functions configured to provide port scaling and protection (e.g., Link Aggregation Groups (LAGs), Flexible Ethernet (FlexE), or the like, as well as various combinations thereof).

In the illustrated example, the optical interface device 220 also includes a set of six optical line interfaces 229-1-229-6 (collectively, optical line interfaces 229) which, in the example of FIG. 2, are Physical Coding Sublayer (PCS) Dense Wavelength Division Multiplexing (DWDM) lines. The optical line interfaces 229 may support maximum rates which may or may not match the rates of the pluggable client interfaces 221. For example, in the example of FIG. 2, even though the pluggable client interfaces 221 are 800 G interfaces, the optical line interfaces 229 may support interface rates having a maximum of 600 G (e.g., DWDM wavelength channels with a maximum rate of 600 G). It will be appreciated that various other rates may be supported by the optical line interfaces 229. The optical line interfaces 229 support wavelength channels which may be used by the optical interface device 220 for transporting data packets associated with the packet network device 210 (e.g., transmission of data packets from the packet routing device 210 over the wavelength channels and reception of data packets for the packet routing device 210 over the wavelength channels).

The optical interface device 220 is configured to support mapping of data packets from the pluggable client interfaces 221, received from the pluggable client interfaces 211 of the packet routing device 210, onto wavelength channels of the optical line interfaces 229. The optical interface device 220 is configured to support mapping of data packets from the pluggable client interfaces 221 onto wavelength channels of the optical line interfaces 229 based on QoS mapping information 225 available on the optical network device 220. The QoS mapping information 225 includes mappings of data packet QoS levels to wavelength channel QoS levels, such that, for a given mapping of a data packet QoS level to a wavelength channel QoS level, data packets matching the data packet QoS level are assigned to wavelength channels matching the wavelength channel QoS level. In this manner, based on the QoS mapping information 225, data packets from the pluggable client interfaces 221 may be sent to any of the optical line interfaces 229 based on mapping of data packets having data packet QoS levels to wavelength channels having wavelength QoS levels. The matching of data packet QoS with wavelength channel QoS may be further understood with respect to the specific example of FIG. 2.

In FIG. 2, assume that the pluggable client interfaces 211-1 and 221-1 are operating as 800 G ports supporting transport of data packets that will be communicated from the packet routing device 210 via the optical interface device 220. Here, rather than using capacity matching to match the 800 G interfaces to a set of wavelength channels providing 800 G (e.g., 2×400 G wavelength channels or 4×200 G wavelength channels), QoS matching indicative mappings of data packet QoS to wavelength channel QoS may be used to match data packets having particular data packet QoS to wavelength channels having particular wavelength channel QoS. In the example of FIG. 2, the set of wavelength channels used for supporting transport of data packets over the optical fiber network includes (a) one gold 100 G PCS wavelength channel, associated with optical line 229-1, with high availability and long reach, (b) one silver 150 G PCS wavelength channel, associated with optical line 229-2, with medium availability and long reach, (c) one bronze 300 G PCS wavelength channel, associated with optical line 229-3, with medium availability and long reach, and (d) one yellow 600 G PCS wavelength channel, associated with optical line 229-6, with low availability and long reach. In other words, using this approach of QoS matching, the 4-wavelength channel capacity has been increased from 800 G (e.g., if two identical 400 G wavelength channels were used or if four identical 200 G wavelength channels were used) to 1,150 G (100 G gold+150 G silver+300 G bronze+600 G yellow). It will be appreciated that this is merely one example of a set of wavelength channels which may be used to support transport of data packets of a client interface and that various other sets of wavelength channels may be used to support transport of data packets of a client interface (e.g., using few or more wavelength channels per set, using wavelength channels having other capacities, using wavelength channels having other QoS levels, using wavelength channels going to different numbers of destinations, or the like, as well as various combinations thereof).

It will be appreciated that the use of data packet QoS to wavelength channel QoS matching may provide various operational and/or cost efficiencies, support use of various optical fiber network innovations (e.g., innovations which make optical fiber networks more dynamic than relatively static optical fiber networks of the past, while also hiding from the data packet network (e.g., from the router ports of routers which utilize the optical fiber network at the physical layer) the wavelength channel implementations which utilize such innovations), support various use cases in which new optical network operator service offers may be supported, support new ways to interconnect routers to simplify operations and improve or even optimize network performance, support more environmentally friendly network designs (e.g., by reducing the connectivity, latency, and cost required to reach remote data centers and other locations where space and renewable energy are more easily attained), or the like, as well as various combinations thereof. For example, in the example above the gold, silver, and yellow wavelength channels can go to different destinations and, thus, enable transit routers to be bypassed using optical devices (which reduces network latency, saves on router CAPEX and extends router lifetime since the router will not need to route as many data packets, and so forth). It will be appreciated that various other advantages or potential advantages also may be realized based on various example embodiments for use of data packet QoS to wavelength channel QoS matching to support transport of data packets over optical fiber networks.

It will be appreciated that the use of data packet QoS to wavelength channel QoS matching may obviate the need for matching the total capacity requirements of the router port to the total wavelength capacity of the wavelength channels underlying the router port (although it will be appreciated that such capacity matching still may be applied) and, thus, may result in a tradeoff of wavelength channel performance for wavelength channel availability, which may be mitigated in various ways based on the QoS mapping between data packet QoS and wavelength channel QoS as discussed further below.

In at least some example embodiments, potential risks associated with running wavelength channels with less availability may be mitigated. In at least some example embodiments, enhanced telemetry may be utilized to reduce or even minimize potential risks associated with operating wavelength channels with less availability. The enhanced telemetry may be based on an enhanced telemetry function operating on the optical device (e.g., optical interface device) for capturing and providing telemetry data and an enhanced telemetry function operating on the controller for processing the telemetry data to perform various functions related to reducing or even minimizing potential risks associated with running wavelength channels with less availability. For example, telemetry data which may be collected on the optical interface device may include source and destination information, availability level, packets per QoS, current packet congestion level, current packet arrival rates, time of day, or the like, as well as various combinations thereof. For example, telemetry functions which may be performed by the controller based on telemetry data received from the optical devices may include predicting wavelength channel impairments to minimize the risk of running them with less availability, monitoring data packet congestion, supporting network-wide congestion avoidance capabilities, supporting use of machine learning algorithms (e.g., to augment existing network optimization capabilities, support prediction of future network needs (e.g., more wavelength channels to support gold QoS are needed in certain areas of the network), or the like), supporting creation of tools for the users of the wavelength channel fabric (e.g., dashboards, network topology capacity maps, or the like), or the like, as well as various combinations thereof.

In at least some example embodiments, as discussed above, congestion avoidance may be utilized to enable routers to burst to rates that exceed the rates of individual QoS wavelengths that support the router port. For example, the aggregate rate of the wavelength channels supporting a router port may be less than the rate of the router port (e.g., the following wavelength rates, which have an aggregate wavelength channel rate of 750 G, may be supporting an 800 G router port: 100 G gold, 150 G silver, 200 G bronze, and 300 G yellow). In this example, the router would run the QoS scheduling on the 800 G port at the 750 G aggregate wavelength channel rate of the wavelength channels supporting the router port. This is commonly referred to as operating a port at a sub-rate or a shaped-rate. However, there may be situations in which it may be necessary or desirable to allow the router QoS traffic to exceed one or more of the individual wavelength channel rates (e.g., the router has a brief period when it sends 750 G of gold traffic even though the constituent gold wavelength channel rate is only 100 G). It will be appreciated that various congestion avoidance mechanisms may be applied to permit the router QoS traffic to exceed one or more of the individual wavelength channel rates without encountering congestion problems.

In at least some example embodiments, congestion avoidance may be supported by using configurable congestion thresholds on each of the wavelength channels and by spilling data packets between wavelength channels when the congestion thresholds are reached. The spillover of data packets between wavelength channels for supporting traffic from a port may be performed by scheduling and transmitting such spilled data packets via adjacent QoS wavelength channels, such as by scheduling and transmitting data packets typically scheduled to be carried by a current QoS wavelength channel instead to a next QoS wavelength channel (e.g., to the next highest QoS wavelength channel, the next lowest QoS wavelength channel, or the like) once the threshold of the current QoS wavelength channel is reached. The spillover of data packets between wavelength channels for supporting traffic from a port may be performed by scheduling and transmitting in various directions in terms of relative wavelength channel QoS levels, such as by working down the wavelength channel QoS levels from higher wavelength channel QoS levels toward lower wavelength channel QoS levels (e.g., if the data packet would normally be scheduled to the highest wavelength channel QoS level), working up the wavelength channel QoS levels from lower wavelength channel QoS levels toward higher wavelength channel QoS levels (e.g., if the data packet would normally be scheduled to the lowest wavelength channel QoS level), based on prioritization of wavelength channel QoS levels for spillover, or the like, as well as various combinations thereof. Such spillover of data packets between wavelength channels for supporting traffic from a port may be performed using the ratio of wavelength channel rates. Such spillover of data packets between wavelength channels also may be used to combine wavelength channels together to support data packet QoS (e.g., 2×100 G gold wavelength channels to achieve 200 G gold packet capacity, 3×150 silver wavelength channels to achieve 450 G silver packet capacity, and so forth). It will be appreciated that such spillover of data packets between wavelength channels for supporting traffic from a port may be performed in various other ways. The spillover of data packets between wavelength channels for supporting traffic from a port may be further understood by considering the following examples.

For example, as indicated above, such spillover of data packets between wavelength channels for supporting traffic from a port may be performed by starting with the highest wavelength channel QoS and spilling toward the lowest wavelength channel QoS. For example, in continuation of the example above in which the aggregate wavelength channel rate of 750 G (based on a 100 G gold wavelength channel, a 150 G silver wavelength channel, a 200 G bronze wavelength channel, and a 300 G yellow wavelength channel) is supporting an 800 G router port support gold traffic, such data packet spilling could be performed as follows. First, once the 800 G of gold traffic from the port reaches the 100 G wavelength channel threshold of the 100 G gold wavelength channel, three of every five data packets (or 60%) would be instead directed (or spill over) to the 150 G silver wavelength channel (since the 150 G of such 150 G silver wavelength channel is 60% of the combined 250 G bandwidth of the combination of the 100 G gold wavelength channel and the 150 G silver wavelength channel). Then, once the 150 G wavelength channel threshold of the 150 G silver wavelength channel is reached, four of every nine data packets (or 44.4%) would be directed (or spill over) to the 200 G bronze wavelength channel (since the 200 G of the 200 G bronze wavelength channel is 44.4% of the combined 450 G bandwidth of the combination of the 100 G gold wavelength channel, the 150 G silver wavelength channel, and the 200 G bronze wavelength channel). Such spillover may continue in this manner until the 800 G of gold traffic from the port is switched or scheduled to the wavelength channel fabric of the optical network device.

For example, as indicated above, such spillover of data packets between wavelength channels for supporting traffic from a port may be performed by starting with the current wavelength channel QoS and redirecting toward the lowest wavelength QoS and then redirecting above the current wavelength channel QoS. For example, in continuation of the example above in which the aggregate wavelength channel rate of 750 G (based on a 100 G gold wavelength channel, a 150 G silver wavelength channel, a 200 G bronze wavelength channel, and a 300 G yellow wavelength channel) is supporting an 800 G router port supporting silver traffic, data packet spilling would be performed as follows. First, once the 800 G of silver traffic from the port reaches the 150 G wavelength channel threshold of the 150 G silver wavelength channel, three of every seven data packets (or 42.9%) would be directed (or spill over) to the 200 G bronze wavelength channel (since the 200 G of the 200 G bronze wavelength channel is 42.9% of the combined 350 G bandwidth of the combination of the 150 G silver wavelength channel and the 200 G bronze wavelength channel). Then, once the 200 G wavelength channel threshold of the 200 G bronze wavelength channel is reached, six of every thirteen data packets (or 46.2%) would be directed instead (or spill over) to the 300 G yellow wavelength channel (since the 300 G of the 300 G yellow wavelength channel is 46.2% of the combined 650 G bandwidth of the combination of the 150 G silver wavelength channel, the 200 G bronze wavelength channel, and the 300 G yellow wavelength channel). Then, once the 300 G wavelength channel threshold of the 300 G yellow wavelength channel is reached, ten of every seventy-five data packets (or 13.3%) would be directed instead (or spill over) to the 100 G gold wavelength channel (since the 100 G of the 100 G gold wavelength channel is 13.3% of the combined 750 G bandwidth of the combination of the 150 G silver wavelength channel, the 200 G bronze wavelength channel, the 300 G yellow wavelength channel, and the 100 G gold wavelength channel). Such spillover or redirection may continue in this manner until the 800 G of silver traffic from the port is switched onto the wavelength channel fabric of the optical network device.

It will be appreciated that, although primarily described with respect to example embodiments in which data packet spilling is performed across a set of wavelength channels going to the same destination, in at least some example embodiments similar data packet spilling may be performed across a set of wavelength channels for carrying data to multiple destinations (e.g., spilling over to wavelength channels for carrying traffic to the same destination first and then spilling over to wavelength channels for carrying traffic to other destinations if needed) as long as use of wavelength channels to multiple destinations does not cause problems (e.g., creation of the looping transmission of data packet, data packet flow reordering, and so forth).

It will be appreciated that various other congestion avoidance mechanisms may be used to support data packet QoS burst rates that exceed QoS wavelength channel rates.

It will be appreciated that, although primarily presented with respect to example embodiments in which QoS mapping is supported on an optical interface device card (e.g., optical interface device 220 of FIG. 2), in at least some example embodiments QoS mapping may be supported on one or more other elements (e.g., a router card of a router 111, a card of an optical device 112, or the like) in place of or in addition to support of QoS mapping on the optical interface device. It will be appreciated that, in at least some example embodiments in which use of QoS mapping to perform mapping of data packets to wavelength channels is supported on an optical card, the optical card may be configured to operate as an optical demarcation device (which supports existing operational models, supports wavelength channel services, and so forth), may be configured to support new services (e.g., sub-rate 800 G ports with QoS guarantees and smooth evolution to higher capacity n×800 G client rates, VLANs mapped to wavelength channels, wavelength channel fabric as a service, or the like, as well as various combinations thereof), may be configured to support various operations (e.g., seamless optical adjustments under IP client ports, optimal spectrum utilization with DWDM wavelength channels, e.g., with probabilistic constellation shaping (PCS), and enhanced wavelength telemetry, use of various operational models, wavelength fabric abstraction to insulate IP routers from optical innovations, or the like, as well as various combinations thereof), or the like, as well as various combinations thereof. It will be appreciated that, in at least some example embodiments in which use of QoS mapping to perform mapping of data packets to wavelength channels is supported on an router card, the router card may be configured to support use of new IP and optical integration and management software, support IP bypass using optical device wavelength channel transit (e.g., when reconfigurable optical add/drop multiplexers (ROADMs) are involved), support wavelength-channel digital signal processors (DSPs) and enhanced telemetry for maximizing optical resources, support internal logical port structures, or the like, as well as various combinations thereof.

It will be appreciated that use of QoS mapping for supporting mapping of data packets to wavelength channels may be implemented in various other ways.

Figure 3:
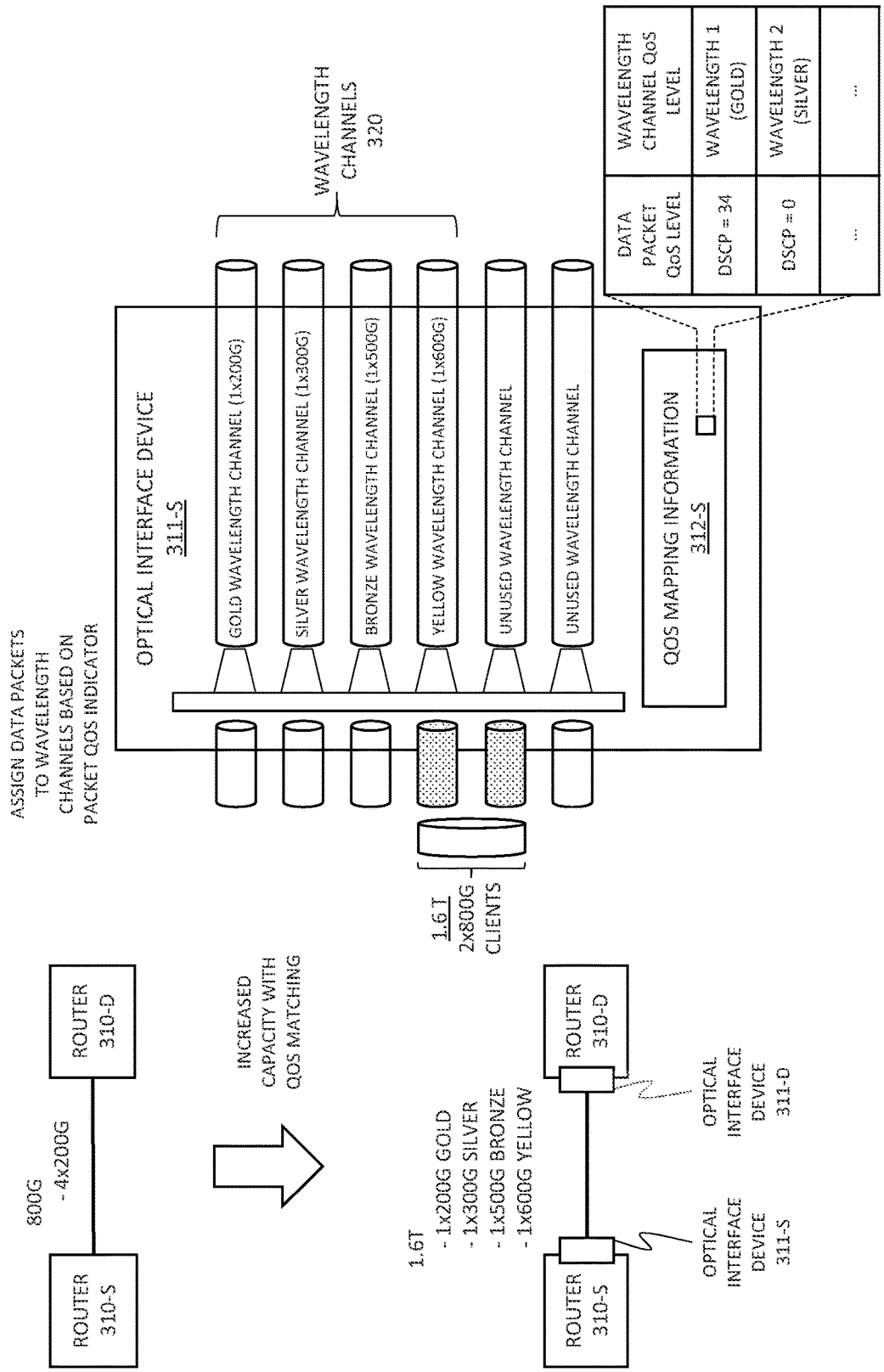
FIG. 3 depicts an example embodiment of a portion of a communication network for illustrating mapping of data packets from a packet routing device to wavelength channels of an optical interface device using QoS mapping information that is based on packet QoS indicators of the data packets.

FIG. 3 depicts an example embodiment of a portion of an optical fiber communication network for illustrating mapping of data packets from a packet routing device to wavelength channels of an optical interface device based on QoS mapping information that is based on packet QoS indicators of the data packets.

In FIG. 3, a source router 310-S and a destination router 310-D are connected via an 800 G packet interface supported by an underlying optical fiber network. The source router 310-S interfaces with the optical fiber network via an optical interface device 311-S and the destination router 310-D interfaces with the optical fiber network via an optical interface device 311-D. In FIG. 3, rather than having four 200 G wavelength channels underlying the 800 G packet interface (4×200 G=800 G of capacity) as shown at the top left of FIG. 3, support for data packet QoS to wavelength channel QoS mapping for the source router 310-S enables the arrangement shown at the bottom left of FIG. 3 in which the set of wavelength channels 320 underlying the 800 G packet interface includes a 200 G gold wavelength channel, a 300 G silver wavelength channel, a 500 G bronze wavelength channel, and a 600 G yellow wavelength channel (providing a total of 1.6 T of capacity). In the example of FIG. 3, a DSCP value of 34 is illustrated as being mapped to a particular wavelength channel (denoted as WAVELENGTH 1), which is the 200 G gold wavelength channel in the set of wavelength channels 320. Similarly, in the example of FIG. 3, a DSCP value of 0 is illustrated as being mapped to a particular wavelength channel (denoted as WAVELENGTH 2), which is the 300 G silver wavelength channel in the set of wavelength channels 320. In this manner, support for data packet QoS to wavelength channel QoS mapping at the source router 310-S enables capacity expansion from the source router 310-S to the destination router 310-D (i.e., double the capacity in this example, and it will be appreciated that the expansion may be smaller or larger in various implementations).

In FIG. 3, as illustrated on the right side of FIG. 3, the optical transponder 311-S associated with the source router 310-S is configured to map data packets of two 800 G packet interfaces to wavelength channels in the set of wavelength channels 320 (which, again, includes the 200 G gold wavelength channel, the 300 G silver wavelength channel, the 500 G bronze wavelength channel, and the 600 G yellow wavelength channel). The optical interface device 311-S maps data packets to the wavelength channels in the set of wavelength channels 320 based on QoS mapping information 312-S. The QoS mapping information 312-S is used to map data packets having the data packet QoS to wavelength channels having the wavelength channel QoS. The data packet QoS of the data packets may be based on data packet QoS levels of the data packets. The data packet QoS levels of the data packets may be determined from the data packets in various ways, such as based on QoS markings within the data packets (e.g., DSCP values, CoS values, or the like), based on matching of tuples from the headers of the data packets (e.g., 5-tuples based on source and destination IP addresses, source and destination ports, and protocol, or other suitable tuples which may be based on various header fields or combinations of fields), based on deep packet inspection on the data packets, or the like, as well as various combinations thereof. It will be appreciated that the QoS mapping information 312-S may include various other types of information which may be used to map data packets having the data packet QoS to wavelength channels having the wavelength channel QoS.

In FIG. 3, use of data packet QoS to wavelength channel QoS mapping may provide increased port wavelength channel capacity, support new optical network operator service offers, support new ways to interconnect routers to simplify operations and improve or even optimize network performance, or the like as well as various combinations thereof. For example, use of data packet QoS to wavelength channel QoS mapping may be configured to enable the optical network operator to offer new optical connectivity services (e.g., sub-rate services (e.g., 650 G of wavelength channel capacity behind an 800GE router port), tailored QoS (e.g., 800 G port gold wavelength channels being protected with GMPLS protection and restoration, VLAN connectivity services, wavelength channel fabric service configured to connect routers, or the like, as well as various combinations thereof), and extract more network capacity from the network to support such optical connectivity services.

It will be appreciated that the example embodiments of FIG. 3, while supporting transport of data packets based on optical fiber networks, may support various other resource gains or efficiencies, services, capabilities, abstractions, or the like, as well as various combinations thereof.

Figure 4:
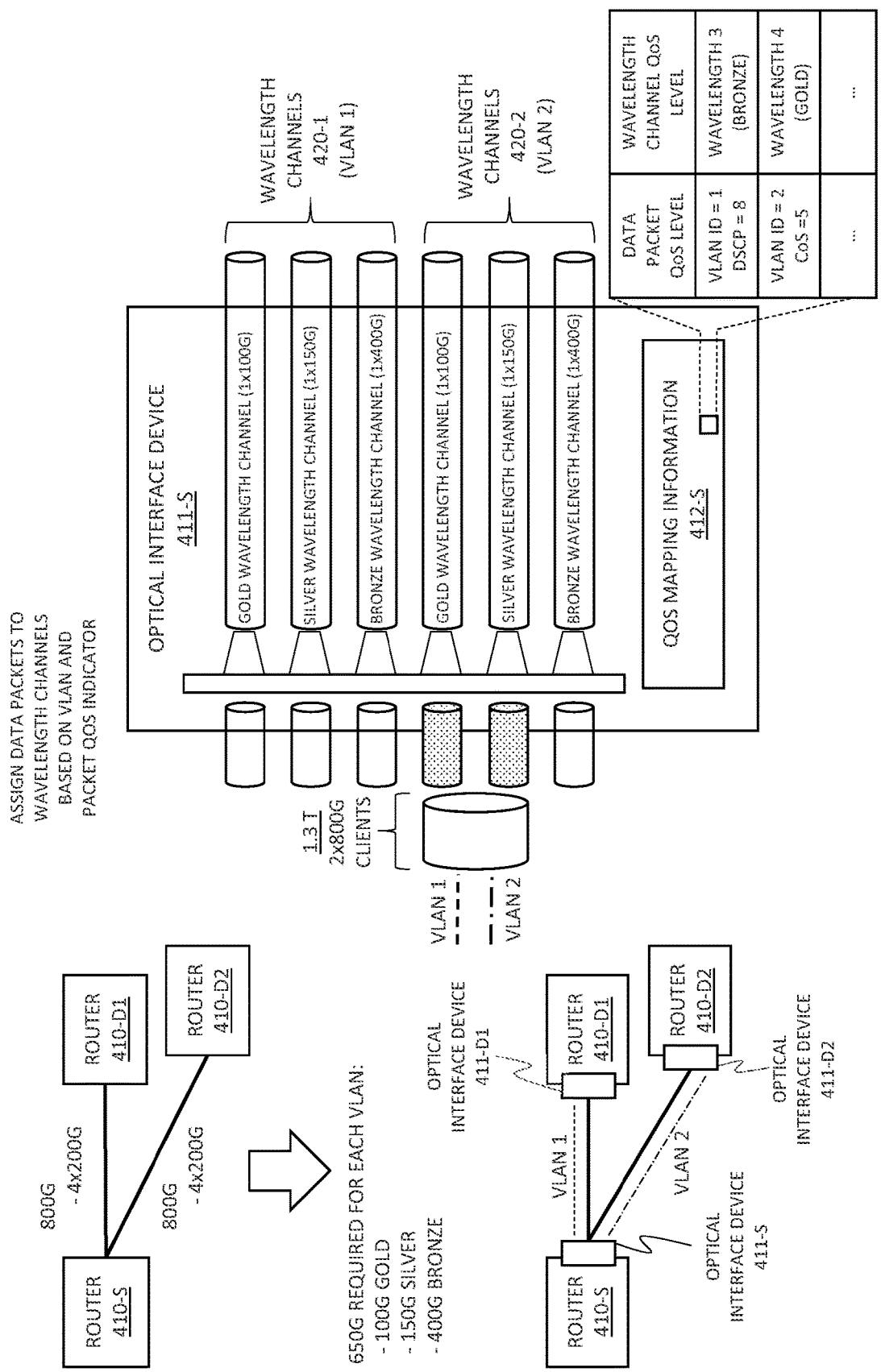
FIG. 4 depicts an example embodiment of a portion of a communication network for illustrating mapping of data packets from a packet routing device to wavelength channels of an optical interface device using QoS mapping information that is based on virtual local area networks (VLANs) with which the data packets are associated and packet QoS indicators of the data packets.

FIG. 4 depicts an example embodiment of a portion of a communication network for illustrating mapping of data packets from a packet routing device to wavelength channels of an optical interface device using QoS mapping information that is based on VLANs with which the data packets are associated and packet QoS indicators of the data packets.

In FIG. 4, a source router 410-S is connected to two destination routers 410-D1 and 410-D2 via two bonded 800 G packet interfaces (e.g., using LAG or FlexE 800 G port bonding) supported by an underlying optical fiber network. The source router 410-S and the destination router 410-D1 are connected via a VLAN running over the bonded 800 G packet interfaces supported by the underlying optical fiber network and, similarly, the source router 410-S and the destination router 410-D2 are connected via a VLAN running over the bonded 800 G packet interfaces supported by the underlying optical fiber network. The source router 410-S interfaces with the optical fiber network via an optical interface device 411-S and the destination routers 420-D1 and 420-D2 interface with the optical fiber network via optical interface devices 411-D1 and 411-D2, respectively. In FIG. 4, rather than having four 200 G wavelength channels underlying the 800 G packet interfaces (4×200 G=800 G of capacity) as shown at the top left of FIG. 4, support for data packet QoS to wavelength channel QoS mapping for the source router 410-S enables the arrangement shown at the bottom left of FIG. 4 in which two different VLANs are supported using a set of wavelength channels 420 underlying the two bonded 800 G packet interfaces (including two 100 G gold wavelength channels, two 150 G silver wavelength channels, and two 400 G bronze wavelength channels). The first VLAN (denoted as VLAN 1) transports traffic between the source router 410-S and the destination router 410-D1 based on a set of wavelength channels 420-1 that includes a first 100 G gold wavelength channel, a first 150 G silver wavelength channel, and a first 400 G bronze wavelength channel (providing a total of 650 G of capacity for VLAN 1). The second VLAN (denoted as VLAN 2) transports traffic between the source router 410-S and the destination router 410-D2 based on a set of wavelength channels 420-2 that includes a second 100 G gold wavelength channel, a second 150 G silver wavelength channel, and a second 400 G bronze wavelength channel (providing a total of 650 G of capacity for VLAN 2). The total capacity supported by the source router 410-S and the underlying optical fiber network for VLAN 1 and VLAN 2 is 1.3 T (650 G for VLAN 1 and 650 G for VLAN 2). In the example of FIG. 4, a combination of a VLAN ID=1 (for VLAN 1) and a DSCP value of 8 is illustrated as being mapped to a particular wavelength channel (denoted as WAVELENGTH 3), which is the 400 G bronze wavelength channel in the set of wavelength channels 420-1. Similarly, in the example of FIG. 4, a combination of a VLAN ID=2 (for VLAN 2) and a CoS value of 5 is illustrated as being mapped to a particular wavelength channel (denoted as WAVELENGTH 4), which is the 100 G gold wavelength channel in the set of wavelength channels 420-2. In this manner, support for data packet QoS to wavelength channel QoS mapping at the source router 410-S enables capacity expansion from the source router 410-S to the destination routers 410-D for the supported VLANs.

In FIG. 4, as illustrated on the right side of FIG. 4, the optical transponder 411-S associated with the source router 410-S is configured to map data packets of the 800 G packet interfaces associated with the destination routers 410-D1 and 410-D2 to wavelength channels in the set of wavelength channels 420. The optical interface device 411-S associated with the source router 410-S is configured to map data packets of the two 800 G packet interfaces associated with the VLAN 1 to the destination router 410-D1 to wavelength channels in the set of wavelength channels 420-1 (which includes the first 100 G gold wavelength channel, the first 150 G silver wavelength channel, and the first 400 G bronze wavelength channel) and is configured to map data packets of the two 800 G packet interfaces associated with the VLAN 2 to the destination router 410-D2 to wavelength channels in the set of wavelength channels 420-2 (which includes the second 100 G gold wavelength channel, the second 150 G silver wavelength channel, and the second 400 G bronze wavelength channel). The optical interface device 411-S maps data packets to the wavelength channels in the set of wavelength channels 420 based on QoS mapping information 412-S. The QoS mapping information 412-S is used to map data packets having the data packet QoS to wavelength channels having the wavelength channel QoS. The data packet QoS of the data packets is based on VLAN IDs of the data packets and QoS levels of the data packets. The QoS levels of the data packets may be determined from the data packets in various ways, such as based on QoS markings within the data packets (e.g., DSCP values, CoS values, or the like), based on matching of tuples from the headers of the data packets (e.g., 5-tuples based on source and destination IP addresses, source and destination ports, and protocol, or other suitable tuples which may be based on various header fields or combinations of fields), based on deep packet inspection on the data packets, or the like, as well as various combinations thereof. The VLAN IDs of the data packets may be determined from the data packets (e.g. where the VLAN IDs have already been inserted into the data packets), from routing information which includes mappings of VLAN IDs to the VLANs of the data packets (e.g., where the VLAN IDs have not yet been inserted into the data packets), or the like. It will be appreciated that the QoS mapping information 412-S may include various other types of information which may be used to map data packets having the data packet QoS to wavelength channels having the wavelength channel QoS.

In FIG. 4, use of data packet QoS to wavelength channel QoS mapping may provide increased port wavelength channel capacity, support multiple router connections, support new optical network operator service offers, support new ways to interconnect routers to simplify operations and improve or even optimize network performance, or the like as well as various combinations thereof. For example, use of data packet QoS to wavelength channel QoS mapping may be configured to enable the optical network operator to offer new optical connectivity services (e.g., sub-rate services (e.g., 650 G of wavelength channel capacity behind an 800 GE router port), tailored QoS (e.g., 800 G port gold wavelength channels being protected with GMPLS protection and restoration, VLAN connectivity services, wavelength channel fabric service configured to connect routers, or the like, as well as various combinations thereof), and extract more network capacity from the network to support such optical connectivity services.

It will be appreciated that the example embodiments of FIG. 4, while supporting transport of data packets based on optical fiber networks, may support various other resource gains or efficiencies, services, capabilities, abstractions, or the like, as well as various combinations thereof.

Figure 5:
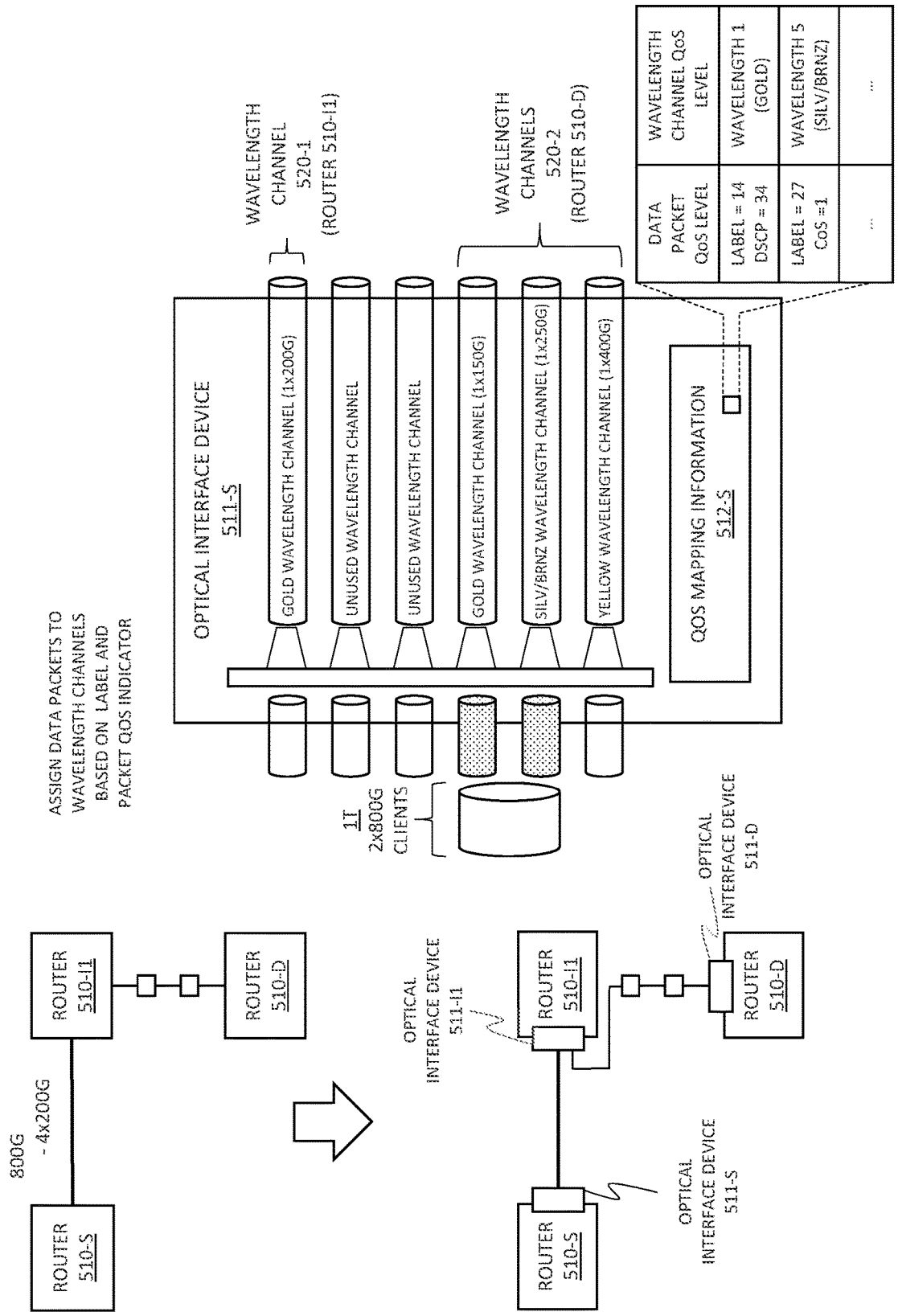
FIG. 5 depicts an example embodiment of a portion of a communication network for illustrating mapping of data packets from a packet routing device to wavelength channels of an optical interface device using QoS mapping information that is based on labels of the data packets and packet QoS indicators of the data packets.

FIG. 5 depicts an example embodiment of a portion of a communication network for illustrating mapping of data packets from a packet routing device to wavelength channels of an optical interface device using QoS mapping information that is based on labels of the data packets and packet QoS indicators of the data packets.

In FIG. 5, a source router 510-S is connected to a destination router 510-D via a chain of intermediate router(s), where communication between routers is supported by an underlying optical fiber network. The source router 510-S is directly connected to an intermediate router 510-I1 via an 800 G packet interface supported by the underlying optical fiber network. The source router 510-S interfaces with the optical fiber network via an optical interface device 511-S, the intermediate router 510-I1 interfaces with the optical fiber network via an optical interface device 511-I1, and the destination router 510-D interfaces with the optical fiber network via an optical interface device 511-D. It will be appreciated that the intermediate router(s) also may operate as destination routers for other flows. In FIG. 5, rather than having four 200 G wavelength channels underlying the 800 G packet interface (4×200 G=800 G of capacity) as shown at the top left of FIG. 5, support for data packet QoS to wavelength channel QoS mapping for the source router 510-S enables the arrangement shown at the bottom left of FIG. 5 in which two different paths to two different routers (namely, a direct path from source router 510-S to intermediate router 510-I1 and a bypass path from source router 510-S to destination router 510-D that bypasses intermediate router 510-I1) are supported using a set of wavelength channels 520 underlying the two 800 G packet interfaces (including a 150 G gold wavelength channel, a 200 G gold wavelength channel, a 250 G silver/bronze wavelength channel, and a 400 G yellow wavelength channel). The first path transports traffic between the source router 510-S and the intermediate router 510-I1 based on a set of wavelength channels 520-1 that initially only includes the 200 G gold wavelength channel (providing a total of 200 G of capacity for the first path). The second path transports traffic between the source router 510-S and the destination router 510-D based on a set of wavelength channels 520-2 that includes the 150 G gold wavelength channel, the 250 G silver/bronze wavelength channel, and the 400 G yellow wavelength channel (providing a total of 800 G of capacity for the second path). The total capacity supported by the source router 510-S and the underlying optical first network for the first and second paths is 1 T (200 G for the first path and 800 G for the second path). In the example of FIG. 5, a combination of a label=14 (identifying intermediate router 510-I1) and a DSCP value of 34 is illustrated as being mapped to a particular wavelength channel (denoted as WAVELENGTH 1), which is the 200 G gold wavelength channel in the set of wavelength channels 520-1. Similarly, in the example of FIG. 5, a combination of a label=27 (identifying destination router 510-D) and a CoS value of 1 is illustrated as being mapped to a particular wavelength channel (denoted as WAVELENGTH 5), which is the 250 G silver/bronze wavelength channel in the set of wavelength channels 520-2. In this manner, support for data packet QoS to wavelength channel QoS mapping at the source router 510-S enables capacity expansion at the source router 510-S, as well as use of bypass paths such as the path from the source router 510-S to the destination router 510-D that bypasses the intermediate routers (and, thus, conserves resources at the intermediate routers, reduces latency by avoiding processing of the data packets at the intermediate routers, and so forth).

In FIG. 5, as illustrated on the right side of FIG. 5, the optical interface device 511-S associated with the source router 510-S is configured to map data packets of the two 800 G packet interfaces associated with the first path to the intermediate router 510-I1 and the second path to the destination router 510-D to wavelength channels in the set of wavelength channels 520. The optical interface device 511-S associated with the source router 510-S is configured to map data packets of the two 800 G packet interfaces associated with the first path to the intermediate router 510-I1 to wavelength channel(s) in the set of wavelength channel(s) 520-1 (which includes the 200 G gold wavelength channel) and is configured to map data packets of the two 800 G packet interfaces associated with the second path to the destination router 510-D to wavelength channels in the set of wavelength channels 520-2 (which includes the 150 G gold wavelength channel, the 250 G silver/bronze wavelength channel, and the 400 G yellow wavelength channel). The optical transponder 511-S maps data packets to the wavelength channels in the set of wavelength channel(s) 520 based on QoS mapping information 512-S. The QoS mapping information 512-S is used to map data packets having the data packet QoS to wavelength channels having the wavelength channel QoS. The data packet QoS of the data packets is based on labels of the data packets (which are associated with the endpoints of the optical paths originating from the source router 510-S) and QoS levels of the data packets. The QoS levels of the data packets may be determined from the data packets in various ways, such as based on QoS markings within the data packets (e.g., DSCP values, CoS values, or the like), based on matching of tuples from the headers of the data packets (e.g., 5-tuples based on source and destination IP addresses, source and destination ports, and protocol, or other suitable tuples which may be based on various header fields or combinations of fields), based on deep packet inspection on the data packets, or the like, as well as various combinations thereof. The labels of the data packets may be determined from the data packets (e.g. where the labels have already been inserted into the data packets), from routing information which includes mappings of labels to the destination routers for the labels (e.g., where the labels have not yet been inserted into the data packets), or the like. It will be appreciated that the QoS mapping information 512-S may include various other types of information which may be used to map data packets having the data packet QoS to wavelength channels having the wavelength channel QoS.

In FIG. 5, use of data packet QoS to wavelength channel QoS mapping may provide increased port wavelength channel capacity, support an abstract wavelength channel fabric for interconnecting routers in a manner that enables the complexity of the wavelength channel fabric to be hidden from the routers, support multiple router connections, support new optical fiber network operator service offers, support new ways to interconnect routers to simplify operations and improve or even optimize network performance, or the like as well as various combinations thereof. For example, use of data packet QoS to wavelength channel QoS mapping may be configured to enable the optical fiber network operator to offer new optical connectivity services (e.g., sub-rate services (e.g., 650 G of wavelength channel capacity behind an 800 GE router port), tailored QoS (e.g., 800 G port gold wavelength channels being protected with GMPLS protection and restoration, VLAN connectivity services, wavelength channel fabric service configured to connect routers, or the like, as well as various combinations thereof), and extract more network capacity from the network to support such optical connectivity services.

It is noted that the manner in which labels are used for supporting switching of data packets to wavelength channels based on QoS mapping information may depend on whether the controller has visibility to both the data packet network and the optical fiber network or whether the controller only has visibility to the data packet network or the optical fiber network, may depend on whether the switching of data packets to wavelength channels is performed on the router (e.g., in a router interface card) or on the optical network element (e.g., in an optical transponder), or the like, as well as various combinations thereof.

The controller may manage both the data packet network and the optical fiber network. For example, the controller may have knowledge of both data packet network capabilities and optical fiber network capabilities, knowledge of the router view of the network topology, knowledge regarding labels used within the data packet network, or the like, as well as various combinations thereof. In at least some such embodiments, the controller may determine the mapping of labels to data packet QoS and wavelength channel QoS, such that a label is associated with a mapping of the data packet QoS to the wavelength channel QoS, and configure the network to support use of the labels for controlling switching of data packets having the data packet QoS to wavelength channels having the wavelength channel QoS. The controller may determine the mapping of the labels to data packet QoS and wavelength channel QoS by generating the labels and assigning the labels to data packet QoS to wavelength channel QoS mappings (e.g., thereby generating labels for use in the data packet network, which may eliminate the need for the data packet network to manage generation of labels), obtaining the labels from the data packet network and assigning the labels to data packet QoS to wavelength channel QoS mappings (e.g. reusing existing labels available in the data packet network), or the like, as well as various combinations thereof. The controller may configure the network to support use of the labels for controlling switching of data packets having the data packet QoS to wavelength channels having the wavelength channel QoS by configuring the routers with label to data packet QoS mapping information (e.g., for use by the routers in assigning labels to data packets based on data packet QoS, for use by routers in determining data packet QoS based on labels included within data packets, or the like, as well as various combinations thereof). The controller may configure the network to support use of the labels for controlling switching of data packets having the data packet QoS to wavelength channels having the wavelength channel QoS by configuring optical interface devices with label to wavelength channel QoS mapping information. It will be appreciated that the controller may provide various other functions for supporting use of the labels for controlling switching of data packets having the data packet QoS to wavelength channels having the wavelength channel QoS. It will be appreciated that use of the controller to provide such functions may enable support for switching of data packets having the data packet QoS to wavelength channels having the wavelength channel QoS without changing the IP view of the network (e.g., IP adjacencies may remain the same).

The controller may manage the optical fiber network without managing the data packet network. For example, the controller may have knowledge of optical fiber network capabilities, but the data packet network may be managed by a data packet network controller (e.g., such that the data packet network controller has knowledge of the router view of the network topology, supports construction of the router labels used in the data packet network, and so forth). In at least some such embodiments, the controller may determine the mapping of labels to data packet QoS and wavelength channel QoS, such that a label is associated with a mapping of the data packet QoS to the wavelength channel QoS, and configure the network to support use of the labels for controlling switching of data packets having the data packet QoS to wavelength channels having the wavelength channel QoS. The controller may determine the mapping of the labels to data packet QoS and wavelength channel QoS by obtaining information identifying the labels used within the data packet network (e.g., from the data packet network, from a data packet network controller managing the data packet network, or the like, as well as various combinations thereof) and assigning the labels to data packet QoS to wavelength channel QoS mappings. The controller may configure the network to support use of the labels for controlling switching of data packets having the data packet QoS to wavelength channels having the wavelength channel QoS by configuring the routers with label to data packet QoS mapping information (e.g., for use by the routers in assigning labels to data packets based on data packet QoS, for use by routers in determining data packet QoS based on labels included within data packets, or the like, as well as various combinations thereof). The controller may configure the network to support use of the labels for controlling switching of data packets having the data packet QoS to wavelength channels having the wavelength channel QoS by configuring the optical interface devices with label to wavelength channel QoS mapping information. It will be appreciated that the controller may provide various other functions for supporting use of the labels for controlling switching of data packets having the data packet QoS to wavelength channels having the wavelength channel QoS. It will be appreciated that use of the controller to provide such functions may enable support for switching of data packets having the data packet QoS to wavelength channels having the wavelength channel QoS without changing the IP view of the network (e.g., IP adjacencies may remain the same).

It will be appreciated that the example embodiments of FIG. 5, while supporting transport of data packets based on optical fiber networks, may support various other resource gains or efficiencies, services, capabilities, abstractions, or the like, as well as various combinations thereof.

It will be appreciated that, although primarily presented with respect to example embodiments in which each wavelength channel is configured to support a single QoS level (e.g., a gold wavelength channel for data packets needing gold QoS, a silver wavelength channel for data packets needing silver QoS, a bronze wavelength channel for data packets needing bronze QoS, a yellow wavelength channel for data packets needing yellow QoS, or the like), in at least some example embodiments one or more wavelength channels may be configured to support multiple QoS levels (e.g., a gold/silver wavelength channel engineered for gold/silver data packet QoS, a silver/bronze wavelength channel engineered for silver/bronze data packet QoS, a bronze/yellow wavelength channel engineered for bronze/yellow data packet QoS, a silver/bronze/yellow wavelength channel engineered for silver/bronze/yellow data packet QoS, or the like). For example, data packets with silver QoS markings and data packets with bronze QoS mappings may be mapped to a silver/bronze wavelength channel engineered for silver wavelength channel QoS, in which case a wavelength channel is saved (since there is no need to run a separate bronze wavelength channel), but bronze data packets get an unnecessary boost in performance. For example, data packets with silver QoS markings and data packets with bronze QoS mappings may be mapped to a silver bronze wavelength channel engineered for bronze wavelength channel QoS, in which case a wavelength channel is saved (since there is no need to run separate a silver wavelength channel) and extra capacity is extracted from the wavelength channel at the expense of availability, but there is a possibility that silver data packets will only receive bronze QoS treatment. It will be appreciated that data packets of multiple QoS levels may be run over wavelength channels in various other ways. It will be appreciated that use of QoS mapping for supporting mapping of data packets to wavelength channels provides greater flexibility in supporting transport of data packets over the wavelength channels, permitting various tradeoffs related to transport of data packets over the wavelength channels.

Figure 6:
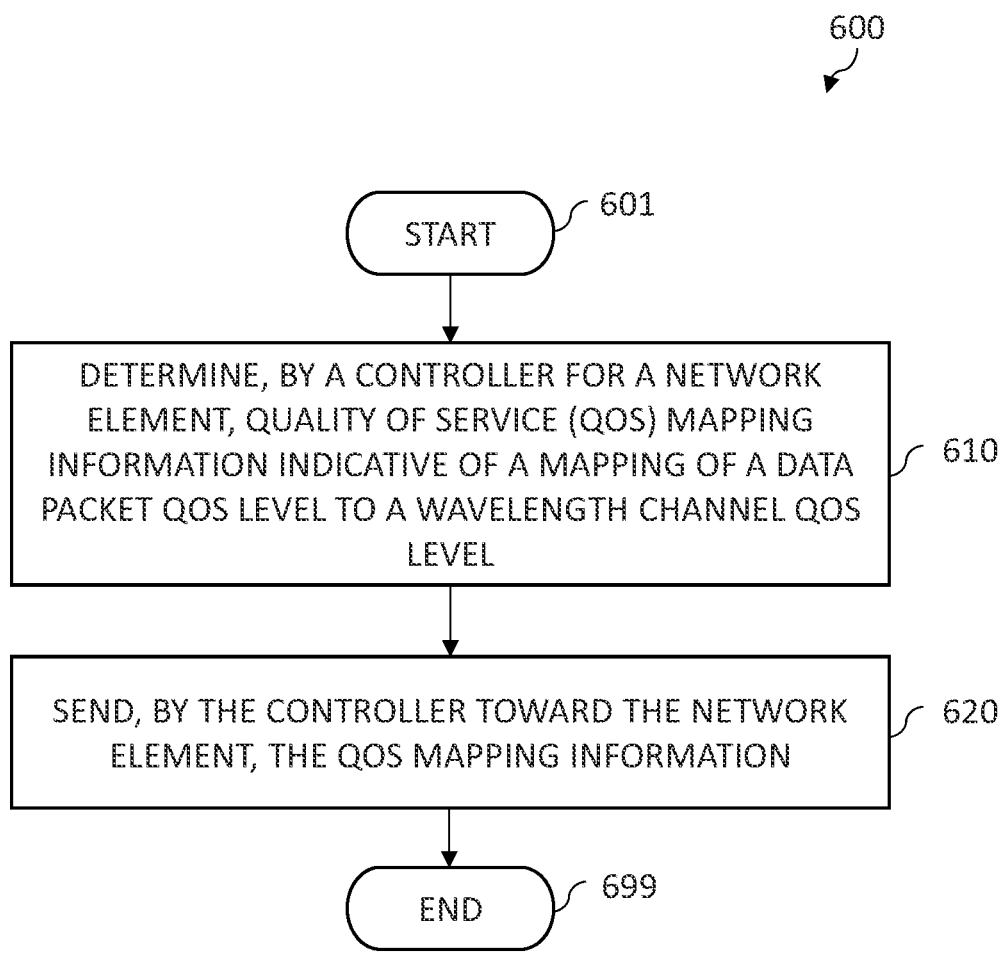
FIG. 6 depicts an example embodiment of a method for use by a controller for supporting mapping of data packets to wavelength channels of a WDM optical fiber link or network based on QoS mapping information indicative of mapping of data packet QoS levels to wavelength channel QoS levels.

FIG. 6 depicts an example embodiment of a method for use by a controller for supporting mapping of data packets to wavelength channels of a WDM optical fiber link or network based on QoS mapping information indicative of mapping of data packet QoS levels to wavelength channel QoS levels. It will be appreciated that, although primarily presented as being performed serially, at least a portion of the functions of method 600 may be performed contemporaneously or in a different order than as presented with respect to FIG. 6. At block 601, method 600 begins. At block 610, determine, by a controller for a network element, quality of service (QoS) mapping information including a mapping of a data packet QoS level to a wavelength channel QoS level. At block 620, send, by the controller toward the network element, the QoS mapping information. At block 699, method 600 ends.

Figure 7:
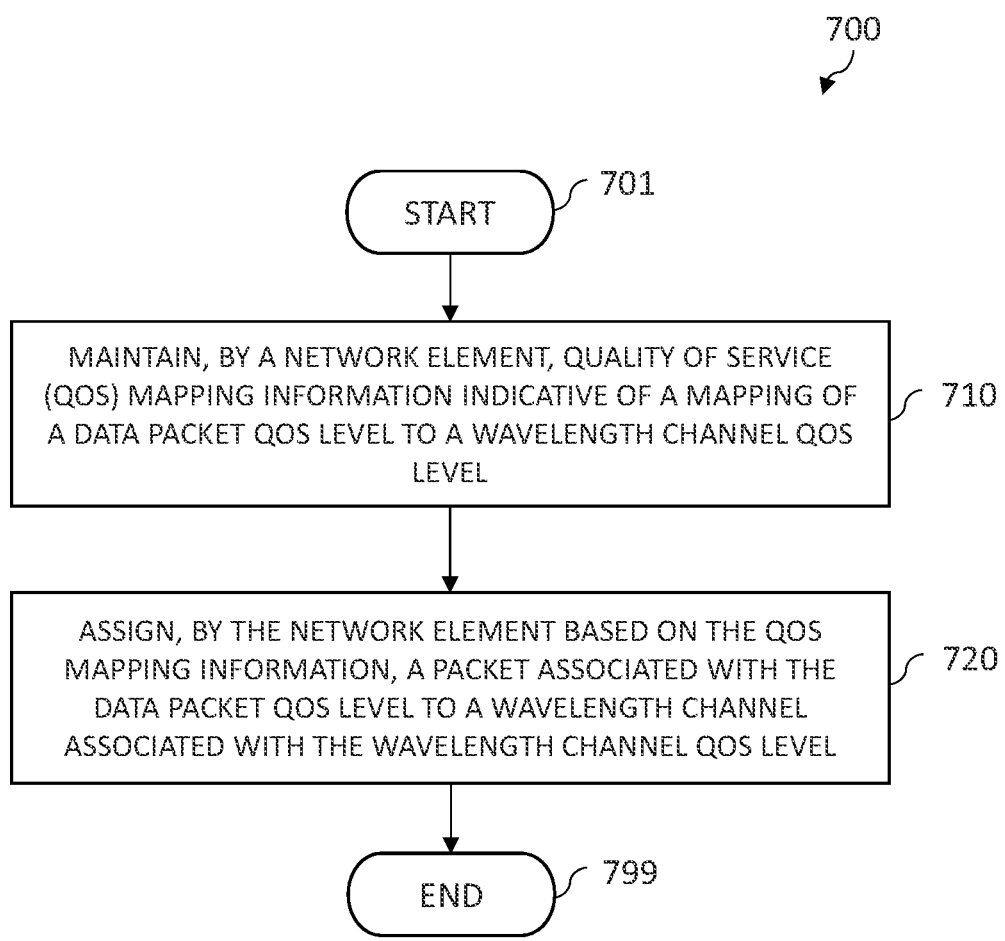
FIG. 7 depicts an example embodiment of a method for use by a network element for supporting mapping of data packets to wavelength channels of a WDM optical fiber link or network based on QoS mapping information indicative of mapping of data packet QoS levels to wavelength channel QoS levels.

FIG. 7 depicts an example embodiment of a method for use by a network element for supporting mapping of data packets to wavelength channels of a WDM optical fiber link or network based on QoS mapping information indicative of mapping of data packet QoS levels to wavelength channel QoS levels. It will be appreciated that, although primarily presented as being performed serially, at least a portion of the functions of method 700 may be performed contemporaneously or in a different order than as presented with respect to FIG. 7. At block 701, method 700 begins. At block 710, maintain, by a network element, quality of service (QoS) mapping information including a mapping of a data packet QoS level to a wavelength channel QoS level. At block 720, assign, by the network element based on the QoS mapping information, a data packet associated with the data packet QoS level to a wavelength channel associated with the wavelength channel QoS level. At block 799, method 700 ends. It will be appreciated that the network element may be a data packet device (e.g., a router for data packets), an optical interface device, an optical network node for an optical fiber network (e.g., an optical network node for a WDM optical fiber network), one or more devices which may include a combination of such devices or some such devices, or the like, as well as various combinations thereof.

Various example embodiments for supporting transport of data packets over optical fiber networks may provide various advantages or potential advantages.

For example, various example embodiments for supporting transport of data packets over optical fiber networks may be configured to provide a new approach, model, and implementation for building and running data packet networks (e.g., IP networks) and physical networks (e.g., optical fiber networks) to attain improved or optimal network connectivity performance at a reduced or even optimal cost (e.g., significant CAPEX and OPEX savings to reduce TCO). For example, various example embodiments for supporting transport of data packets over optical fiber networks may provide various operational and/or cost efficiencies. For example, various example embodiments for supporting transport of data packets over optical fiber networks may be configured to provide various network improvements, provide various operational improvements, or the like, as well as various combinations thereof. For example, various example embodiments for supporting transport of data packets over optical fiber networks may be configured to enable utilization of various optical fiber network innovations, which make optical fiber networks much more dynamic than relatively static optical fiber networks of the past, while also hiding from the data packet network (e.g., from the router ports of routers which utilize the optical fiber network at the physical layer) the wavelength channel implementations which utilize such innovations. For example, various example embodiments for supporting transport of data packets over optical fiber networks may be configured to support various use cases in which new optical network operator service offers may be supported, new ways to interconnect routers to simplify operations and improve or even optimize network performance may be supported, or the like as well as various combinations thereof.

For example, various example embodiments for supporting transport of data packets over optical fiber networks may be configured provide network improvements such as increasing network capacity (e.g., improving wavelength spectral efficiency, supporting sharing of wavelength channels by router ports under various conditions (e.g., time of date, day of week, or the like), reducing network latency, improving wavelength spectral efficiency, improve reassignment of wavelength channel capacity (e.g., to augment router ports operating at sub-rates), supporting more eco-friendly network designs, or the like, as well as various combinations thereof, without increasing operational complexity. For example, various example embodiments for supporting transport of data packets over optical fiber networks may be configured to double network capacity using fewer wavelength channels and reducing latency by using wavelength channels to bypass intermediate routers. For example, various example embodiments for supporting transport of data packets over optical fiber networks may be configured to abstract wavelength channel implementation from the router ports, thereby preventing the router ports from seeing wavelength channels that implement a port rate having different availability levels and potentially different destinations (which router ports are not used to seeing), preventing increases in the number of adjacencies and policies that must be supported by the routers (which would typically rise if all of the wavelength channels used to support QoS mappings were exposed to the routers without abstracting the wavelength channel implementation from the router ports) without having to employ other mechanisms for reducing adjacencies and policies that need to be supported by the routers (e.g., use of VLANs and/or VLAN logical ports with Ethernet switching, both of which add network cost and complexity), and so forth. It will be appreciated that various other results may be achieved in various other types of networks.

For example, various example embodiments for supporting transport of data packets over optical fiber networks may be configured provide operational improvements such as supporting capacity on demand (e.g., by updating router port rates, adding more capacity under router ports, and so forth), supporting demands for floating wavelength channel capacity for wavelength channels used to support QoS mappings (e.g., by updating router port rates, adding more capacity under router ports, and so forth), supporting requests for cost reductions (e.g., by supporting smooth growth and premium traffic support, e.g., at low costs), supporting requests for targeted service capabilities (e.g., by providing wavelength channels supporting targeted protection and restoration, service modification notifications, and so forth), supporting wavelength fabric as a service (e.g., by supporting intents while satisfying bandwidth guarantees and latency reductions), supporting automation (e.g., by supporting automation of fabric connectivity, congestion avoidance and mitigation, QoS guarantees, latency guarantees, and so forth), supporting visibility into operational impacts (e.g., by supporting operations related to WDM wavelength channels, availability, OAM, QoS, and so forth), supporting use of data packet network design, or the like, as well as various combinations thereof.

For example, various example embodiments for supporting transport of data packets over optical fiber networks may be configured to provide network improvements while still enabling various operational models to be supported. For example, various example embodiments for supporting transport of data packets over optical fiber networks may be configured to provide network improvements while still enabling IP and physical optical layer engineering to be performed in isolation. For example, various example embodiments for supporting transport of data packets over optical fiber networks may be configured to increase or even optimize network capacity without requiring use of complex traffic engineering tools (e.g., IP based traffic engineering tools, MPLS traffic engineering tools, or the like, as well as various combinations thereof) to identify unused network capacity, although it will be appreciated that such tools may still be used. For example, various example embodiments for supporting transport of data packets over optical fiber networks may be configured to abstract details of the optical fiber network from the data packet routers, thereby obviating the need for use of extensions (e.g., Segment Routing (SR) which supports finding of wavelength-supporting optical fibers that share common resources, supports identification of wavelength channels to carry specific data packets based on various factors, and so forth) to get more visibility into the optical fiber network, although it will be appreciated that such extensions may be used. For example, various example embodiments for supporting transport of data packets over optical fiber networks may be configured to support use of the latest optical fiber network topologies to maximize network performance, reduce network total cost of operation, and so forth.

For example, various example embodiments for supporting transport of data packets over optical fiber networks may be configured to enable utilization of various optical fiber network innovations, which make optical fiber networks much more dynamic than relatively static optical fiber networks of the past, while also hiding from the data packet network (e.g., from the router ports of data packet routers which utilize the optical fiber network at the physical layer) the wavelength channel implementations which utilize such innovations. For example, one such coherent optical fiber network innovation which may be utilized in conjunction with various example embodiments for supporting transport of data packets over optical fiber networks may be Probabilistic Constellation Shaping (PCS), which enables wavelength channels to be operated more efficiently based on support for flexible wavelength channel capacities in addition to discrete wavelength capacities (e.g., rather than discrete capacities such as 100 G, 200 G, 400 G, and 800 G, PCS enables wavelength channels to be operated at ideal rates to fit current network conditions (e.g., 160 G, 475 G, or the like)). For example, one such optical fiber network innovation which may be utilized in conjunction with various example embodiments for supporting transport of data packets over optical fiber networks may be Colorless-Directionless-Contentionless Flexible-Grid (CDC-F) ROADM technology, as CDC-F enabled ROADMs enable wavelength paths in the optical fiber network to be moved more easily, thereby enabling wavelength channels to support faster restoration schemes that are more cost effective than tradition 1+1 wavelength channel protection. For example, one such optical fiber network innovation which may be utilized in conjunction with various example embodiments for supporting transport of data packets over optical fiber networks may include new data science algorithms configured to provide network operations and network controllers with insights which enable prediction of network performance in terms of maximizing wavelength channel performance for current network conditions, foreseeing potential wavelength channel failures, and so forth, thereby supporting increases in per wavelength channel capacity or network reach by precisely adjusting wavelength channel characteristics based on current and forecasted network conditions.

It will be appreciated that various example embodiments for supporting transport of data packets over optical fiber networks may provide various other advantages or potential advantages.

Figure 8:
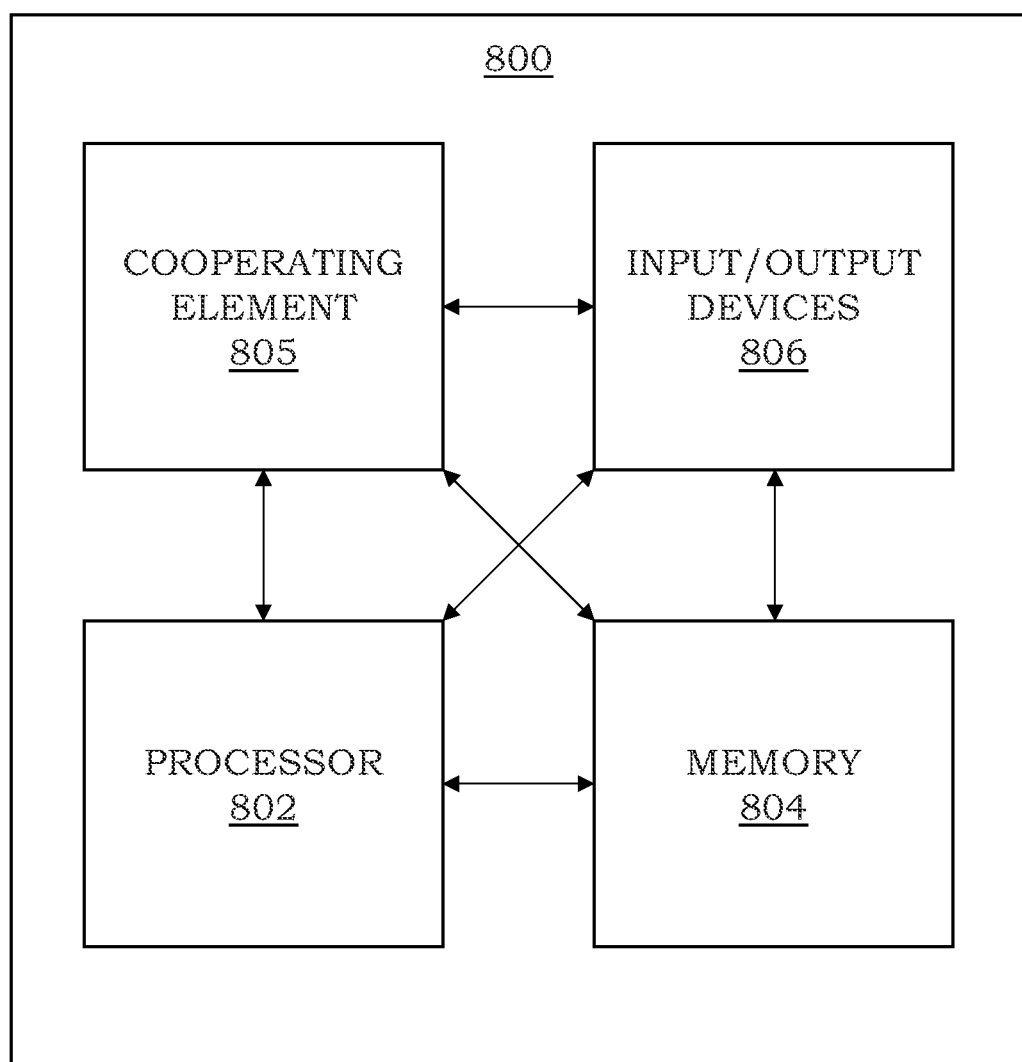
FIG. 8 depicts an example embodiment of a computer suitable for use in performing various functions presented herein.

FIG. 8 depicts an example embodiment of a computer suitable for use in performing various functions presented herein.

The computer 800 includes a processor 802 (e.g., a central processing unit (CPU), a processor, a processor having a set of processor cores, a processor core of a processor, or the like) and a memory 804 (e.g., a random access memory, a read only memory, or the like). The processor 802 and the memory 804 may be communicatively connected. In at least some example embodiments, the computer 800 may include at least one processor and at least one memory including computer program code, wherein the at least one memory and the computer program code are configured, with the at least one processor, to cause the computer to perform various functions presented herein.

The computer 800 also may include a cooperating element 805. The cooperating element 1005 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements presented herein, combinations of functional elements presented herein, or the like, as well as various combinations thereof. For example, computer 800 may provide a general architecture and functionality that is suitable for implementing one or more devices presented herein, such as a controller or a portion thereof, a network element or a portion thereof (e.g., a data packet routing device or a portion thereof, an optical device or a portion thereof, an optical interface device or a portion thereof, and so forth), or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer program code, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a router for data packets; and
   an optical interface device connected to the router and being associated with an optical network node of an optical fiber network; and wherein the optical interface device is configured to maintain quality of service (QOS) mapping information including a mapping of a data packet QoS level to a wavelength channel QoS level; and wherein the optical interface device is configured to assign, based on the QOS mapping information, a data packet associated with the data packet QoS level to a wavelength channel associated with the wavelength channel QoS level for transmission by the optical node to the optical fiber network;

wherein the optical interface device is configured to support congestion avoidance by using configurable congestion thresholds on each of the wavelength channels and by spilling data packets between wavelength channels when the congestion thresholds are reached.

2. The apparatus of claim 1, wherein the data packet QoS level is defined, at least in part, by a QoS indicator of the data packet.

3. The apparatus of claim 2, wherein the QoS indicator of the data packet includes at least one of a QoS marking within the data packet or information determined based on application of deep packet inspection to the data packet.

4. The apparatus of claim 3, wherein the QoS marking within the data packet includes at least one of a Differentiated Services Code Point (DSCP) value included within the data packet or a Class of Service (CoS) value included within the data packet.

5. The apparatus of claim 1, wherein the data packet QoS level is determined, at least in part, by a virtual network or virtual service with which the data packet is associated and a QoS indicator of the data packet.

6. The apparatus of claim 5, wherein the virtual network with which the data packet is associated includes a virtual local area network (VLAN) or the virtual service with which the data packet is associated includes a virtual private local area network (LAN) service (VPLS).

7. The apparatus of claim 1, wherein the data packet QoS level is determined, at least in part, by a label of the data packet and a QoS indicator of the data packet.

8. The apparatus of claim 7, wherein the label of the data packet identifies a destination device for the data packet.

9. The apparatus of claim 1, wherein the data packet QoS level is determined, at least in part, by a data packet QoS treatment level.

10. The apparatus of claim 1, wherein the wavelength channel QoS level identifies the wavelength channel.

11. The apparatus of claim 1, wherein the wavelength channel QoS level identifies a wavelength channel QoS treatment level for the wavelength channel.

12. The apparatus of claim 1, wherein, to assign the data packet associated with the data packet QoS level to the wavelength channel associated with the wavelength channel QoS level, the optical interface device is configured to at least:

determine, based on data packet QoS information from the data packet, the data packet QoS level of the QoS mapping information;

determine, based on the data packet QoS level of the QoS mapping information, the wavelength channel QoS level of the QoS mapping information;

determine, based on the wavelength channel QoS level of the QoS mapping information, the wavelength channel; and assign the data packet to the wavelength channel.

13. The apparatus of claim 1, wherein the QoS mapping information is received from a remote digital controller.

14. The apparatus of claim 1, wherein the optical interface device is configured to provide an interface between a set of client networks and a set of optical transceivers of the optical network node.

15. The apparatus of claim 1, further including a reconfigurable optical add drop multiplexer, the reconfigurable optical add drop multiplexer being communicatively connected to or including the optical interface device.

16. The apparatus of claim 1, wherein the optical interface device includes:

a set of client interfaces configured to receive data packets from at least one packet routing device; and a set of optical transponders configured to transmit and received data-modulated optical carriers on a plurality of wavelength channels.

17. A method, comprising:

in an optical interface device for a wavelength division multiplexed optical network node, maintaining quality of service (QOS) mapping information indicative of a mapping of a data packet QoS level to a wavelength channel QoS level;

in the optical interface device based on the QOS mapping information, assigning a data packet associated with the data packet QoS level to a wavelength channel associated with the wavelength channel QoS level; and in the optical interface device, supporting congestion avoidance by using configurable congestion thresholds on each of the wavelength channels and by spilling data packets between wavelength channels when the congestion thresholds are reached.

18. The method of claim 17, wherein at least one of:

the data packet QoS level is defined, at least in part, by a QOS indicator of the data packet;

the data packet QoS level is determined, at least in part, by a virtual network or virtual service with which the data packet is associated and a QoS indicator of the data packet; or the data packet QoS level is determined, at least in part, by a label of the data packet and a QoS indicator of the data packet.

19. The method of claim 17, wherein assigning the data packet associated with the data packet QoS level to the wavelength channel associated with the wavelength channel QoS level includes:

determining, based on data packet QoS information from the data packet, the data packet QoS level of the QoS mapping information;

determining, based on the data packet QoS level of the QoS mapping information, the wavelength channel QoS level of the QoS mapping information;

determining, based on the wavelength channel QoS level of the QoS mapping information, the wavelength channel; and assigning the data packet to the wavelength channel.

* * * * *